United States Patent
Guim Bernat et al.

(10) Patent No.: US 12,132,790 B2
(45) Date of Patent: *Oct. 29, 2024

(54) QUALITY OF SERVICE (QOS) MANAGEMENT IN EDGE COMPUTING ENVIRONMENTS

(71) Applicant: Intel Corporation, Santa Clara, CA (US)

(72) Inventors: Francesc Guim Bernat, Barcelona (ES); Patrick Bohan, Portland, OR (US); Kshitij Arun Doshi, Tempe, AZ (US); Brinda Ganesh, Portland, OR (US); Andrew J. Herdrich, Hillsboro, OR (US); Monica Kenguva, Phoenix, AZ (US); Karthik Kumar, Chandler, AZ (US); Patrick G Kutch, Tigard, OR (US); Felipe Pastor Beneyto, Holmdel, NJ (US); Rashmin Patel, Chandler, AZ (US); Suraj Prabhakaran, Aachen (DE); Ned M. Smith, Beaverton, OR (US); Petar Torre, Feldkirchen (DE); Alexander Vul, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/875,672

(22) Filed: Jul. 28, 2022

(65) Prior Publication Data

US 2023/0022620 A1      Jan. 26, 2023

Related U.S. Application Data

(63) Continuation of application No. 16/235,137, filed on Dec. 28, 2018, now Pat. No. 11,412,052.

(51) Int. Cl.
*H04L 67/148* (2022.01)
*G06F 9/48* (2006.01)
(Continued)

(52) U.S. Cl.
CPC .......... *H04L 67/148* (2013.01); *G06F 9/4856* (2013.01); *H04L 41/5019* (2013.01);
(Continued)

(58) Field of Classification Search
CPC ... H04L 67/148; H04L 43/0811; H04L 47/82; H04L 41/5003
See application file for complete search history.

(56) References Cited

U.S. PATENT DOCUMENTS 6,477,373 B1 * 11/2002 Rappaport ........ H04W 36/0079
                                                         455/450
8,239,911 B1      8/2012 Sun
(Continued)

FOREIGN PATENT DOCUMENTS

DE      102019217367 A1     7/2020

OTHER PUBLICATIONS

"U.S. Appl. No. 16/235,137, Advisory Action mailed Mar. 8, 2022", 5 pgs.
(Continued)

*Primary Examiner* — William G Trost, IV
*Assistant Examiner* — Adam A Cooney
(74) *Attorney, Agent, or Firm* — Schwegman Lundberg & Woessner, P.A.

(57) ABSTRACT

An architecture to perform resource management among multiple network nodes and associated resources is disclosed. Example resource management techniques include those relating to: proactive reservation of edge computing resources; deadline-driven resource allocation; speculative edge QoS pre-allocation; and automatic QoS migration (Continued)

across edge computing nodes. In a specific example, a technique for service migration includes: identifying a service operated with computing resources in an edge computing system, involving computing capabilities for a connected edge device with an identified service level; identifying a mobility condition for the service, based on a change in network connectivity with the connected edge device; and performing a migration of the service to another edge computing system based on the identified mobility condition, to enable the service to be continued at the second edge computing apparatus to provide computing capabilities for the connected edge device with the identified service level.

28 Claims, 22 Drawing Sheets

(51) Int. Cl.
| | |
|---|---|
| H04L 41/5003 | (2022.01) |
| H04L 41/5019 | (2022.01) |
| H04L 43/0811 | (2022.01) |
| H04L 47/70 | (2022.01) |
| H04L 67/00 | (2022.01) |
| H04L 67/10 | (2022.01) |
| H04W 4/40 | (2018.01) |
| H04W 4/70 | (2018.01) |

(52) U.S. Cl.
CPC .......... *H04L 43/0811* (2013.01); *H04L 47/82* (2013.01); *H04L 67/10* (2013.01); *H04L 67/34* (2013.01); *H04W 4/40* (2018.02); *H04W 4/70* (2018.02); *H04L 41/5003* (2013.01)

(56) References Cited

U.S. PATENT DOCUMENTS

| | | | | |
|---|---|---|---|---|
| 9,141,769 | B1* | 9/2015 | Hitchcock | H04L 9/0877 |
| 9,619,259 | B2* | 4/2017 | Abali | G06F 9/45533 |
| 9,742,684 | B1* | 8/2017 | Krotkov | H04L 47/83 |
| 11,089,523 | B2* | 8/2021 | Ketyko | H04W 16/18 |
| 11,412,052 | B2 | 8/2022 | Guim Bernat et al. | |
| 2003/0137951 | A1* | 7/2003 | Otsuka | H04W 36/18 |
| | | | | 370/328 |
| 2009/0291689 | A1* | 11/2009 | Negishi | H04W 36/32 |
| | | | | 455/436 |
| 2013/0301539 | A1* | 11/2013 | Aguirre | H04W 28/16 |
| | | | | 370/329 |
| 2013/0347064 | A1 | 12/2013 | Aissi | |
| 2014/0200036 | A1 | 7/2014 | Egner et al. | |
| 2015/0006733 | A1* | 1/2015 | Khan | H04L 47/808 |
| | | | | 709/226 |
| 2015/0154056 | A1* | 6/2015 | Chen | G06F 9/4856 |
| | | | | 718/103 |
| 2015/0244716 | A1* | 8/2015 | Potlapally | H04L 63/0853 |
| | | | | 713/155 |
| 2016/0149912 | A1* | 5/2016 | Scott-Nash | H04L 63/0876 |
| | | | | 713/176 |
| 2016/0217295 | A1 | 7/2016 | Goldsack et al. | |
| 2016/0266919 | A1* | 9/2016 | Wang | G06F 9/45558 |
| 2017/0329941 | A1 | 11/2017 | Leheup et al. | |
| 2018/0091477 | A1* | 3/2018 | Furuichi | H04L 63/061 |
| 2018/0115522 | A1 | 4/2018 | Gleichauf | |
| 2018/0263039 | A1 | 9/2018 | Fang et al. | |
| 2019/0036630 | A1* | 1/2019 | Svennebring | H04W 40/12 |
| 2019/0042319 | A1 | 2/2019 | Sood et al. | |
| 2019/0116128 | A1* | 4/2019 | Guo | H04L 67/1021 |
| 2019/0141610 | A1* | 5/2019 | Sabella | G06F 9/45533 |
| 2019/0158606 | A1 | 5/2019 | Guim Bernat et al. | |
| 2019/0356564 | A1 | 11/2019 | Kaneko et al. | |
| 2020/0021498 | A1 | 1/2020 | Kohiga et al. | |
| 2020/0084202 | A1 | 3/2020 | Smith et al. | |
| 2020/0196203 | A1* | 6/2020 | Yang | H04W 36/14 |
| 2021/0076250 | A1* | 3/2021 | Wang | H04W 28/0221 |

OTHER PUBLICATIONS

"U.S. Appl. No. 16/235,137, Advisory Action mailed Jun. 28, 2021", 5 pgs.
"U.S. Appl. No. 16/235,137, Final Office Action mailed Jan. 14, 2022", 34 pgs.
"U.S. Appl. No. 16/235,137, Final Office Action mailed Apr. 19, 2021", 30 pgs.
"U.S. Appl. No. 16/235,137, Non Final Office Action mailed Jul. 20, 2021", 34 pgs.
"U.S. Appl. No. 16/235,137, Non Final Office Action mailed Oct. 5, 2020", 23 pgs.
"U.S. Appl. No. 16/235,137, Notice of Allowance mailed Apr. 1, 2022", 11 pgs.
"U.S. Appl. No. 16/235,137, Response filed Feb. 22, 2022 to Final Office Action mailed Jan. 14, 2022", 16 pgs.
"U.S. Appl. No. 16/235,137, Response filed Jun. 15, 2021 to Final Office Action mailed Apr. 19, 2021", 14 pgs.
"U.S. Appl. No. 16/235,137, Response filed Jul. 12, 2021 to Advisory Action mailed Jun. 28, 2021", 14 pgs.
"U.S. Appl. No. 16/235,137, Response filed Oct. 7, 2021 to Non Final Office Action mailed Jul. 20, 2021", 14 pgs.
"U.S. Appl. No. 16/235,137, Response filed Dec. 31, 2020 to Non Final Office Action mailed Oct. 5, 2020", 14 pgs.
U.S. Appl. No. 16/235,137 11,412,052, filed Dec. 28, 2018, Quality of Service (QoS) Management in Edge Computing Environments.

\* cited by examiner

QUALITY OF SERVICE (QOS) MANAGEMENT IN EDGE COMPUTING ENVIRONMENTS

PRIORITY

This application is a continuation of U.S. patent application Ser. No. 16/235,137, filed Dec. 28, 2018, which is incorporated by reference herein in its entirety.

TECHNICAL FIELD

Embodiments described herein generally relate to edge computing and related distributed computing environments, and in particular, to an edge computing architecture configured to support the transition and migration of services and resources in mobile settings.

BACKGROUND

Edge computing, at a general level, refers to the transition of compute and storage resources closer to, or into, smart endpoint devices (e.g., consumer devices, user equipment, etc.) in order to optimize total cost of ownership, reduce application latency, improve service capabilities, and improve compliance with security or data privacy requirements. Edge computing may in some scenarios provide a cloud-like distributed service, which offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at "edge" of the network.

Edge computing may be further integrated with use cases and technology developed for the Internet of Things (IoT) and Fog networking, as endpoint devices and gateways attempt to access network resources and applications at locations moved closer to the "edge" of the network. For instance, developing edge computing use cases in mobile network settings have been designed for integration with multi-access edge computing (MEC), also known as "mobile edge computing". MEC approaches are designed to allow application developers and content providers to access computing capabilities and an IT service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

In a variety of mobile use and device processing use cases, edge computing attempts to offer reduced latency, increased responsiveness, and more available computing power than offered in traditional cloud network services and wide area network connections. However, the integration of mobility and dynamically launched services has led to a number of limitations with orchestration, coordination, and resource management for applications and services as consumer devices transition from one location (having an initial set of computing resources) to another location (having a different set of computing resources). In these and other complex mobility scenarios, applications and consuming devices have typically resorted to using well-known services from cloud locations, beyond the network edge. As a result, many existing device deployments have not achieved the full benefits that edge computing is intended to offer.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for various aspects of quality of service (QoS) management in edge computing environments, though the use of service and resource management techniques. In a first example, explained in further detail below, such QoS management may occur with a proactive reservation of edge computing resources, which enables relevant processing and system resources to be pre-reserved and allocated for services at other computing systems. In a second example, explained in further detail below, the QoS management may occur with deadline-driven resource allocation, which enables relevant processing and system resources to be reserved and prepared, in many cases ahead of usage, even as devices transition between computing locations in mobile scenarios. In a third example, explained in further detail below, the QoS management may occur with a speculative edge computing resource pre-allocation, which allocates certain resources at different locations in an effort to maintain a QoS for device services. In a fourth example, explained in further detail below, the QoS management may occur with automatic migration of services, users, or resource configurations among various edge computing nodes, in an effort to maintain QoS levels for resource usage.

Figure 16:
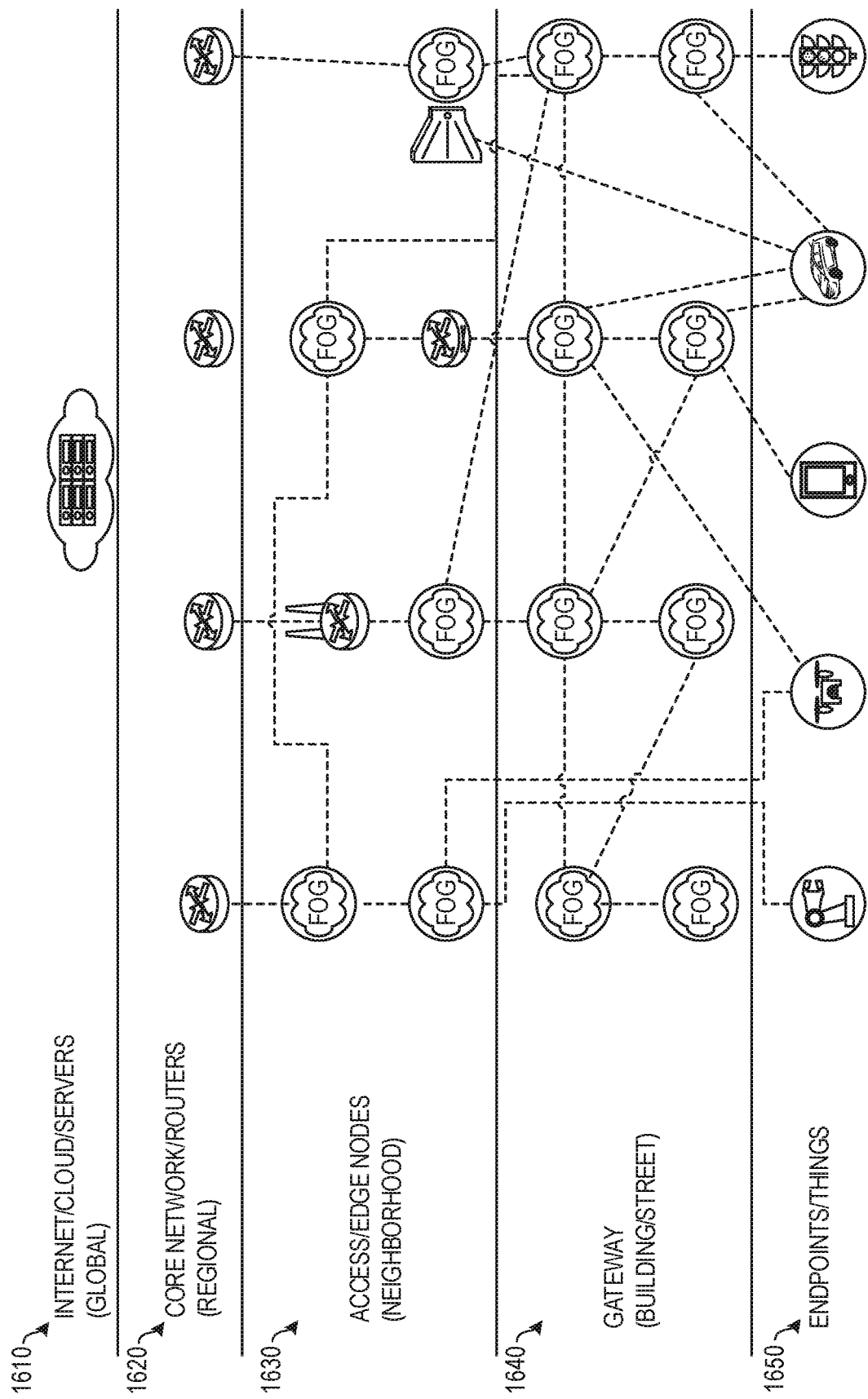
FIG. 16 illustrates a MEC and FOG network topology, according to an example.
Figure 17:
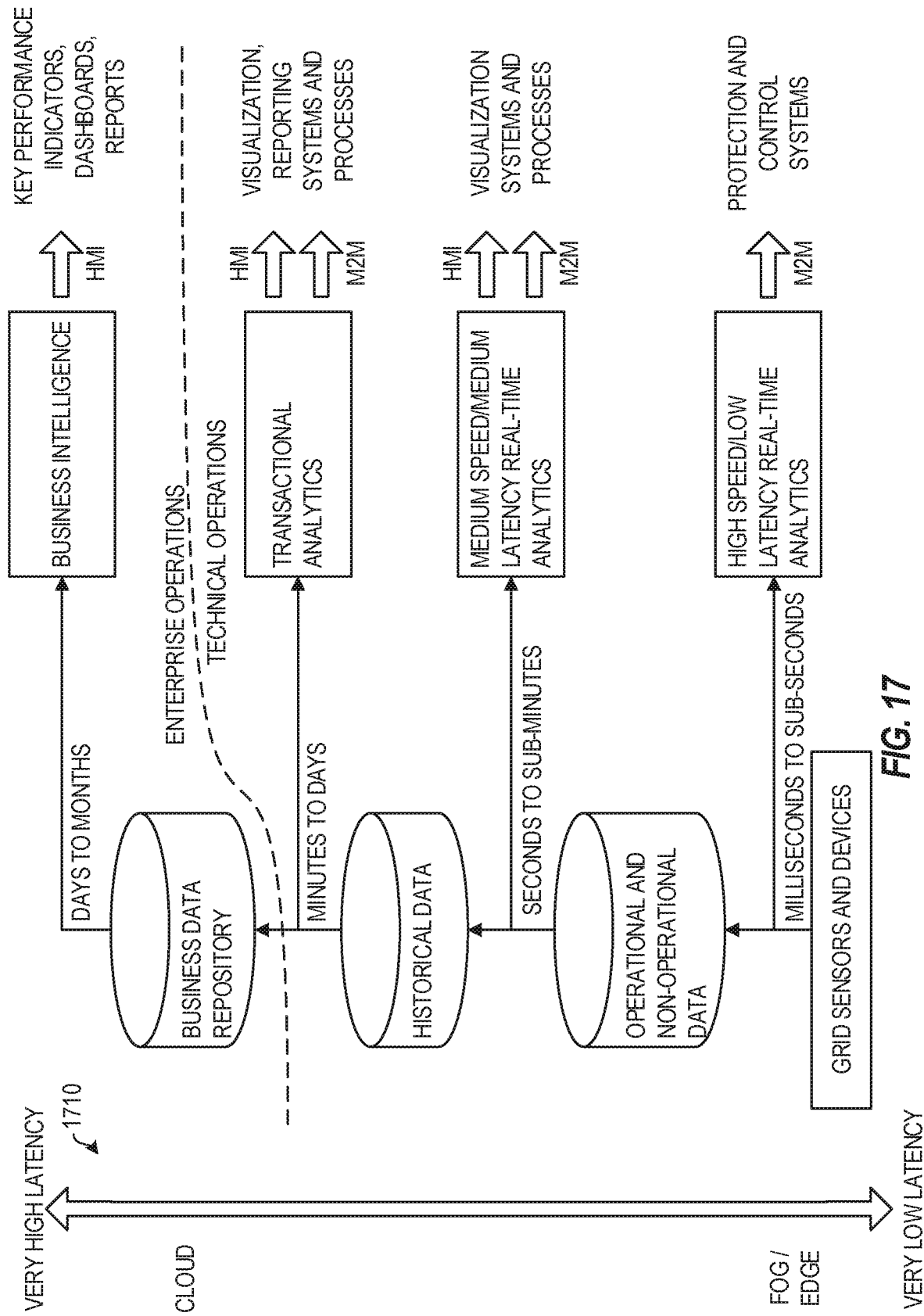
FIG. 17 illustrates processing and storage layers in a MEC and FOG network, according to an example.
Figure 18:
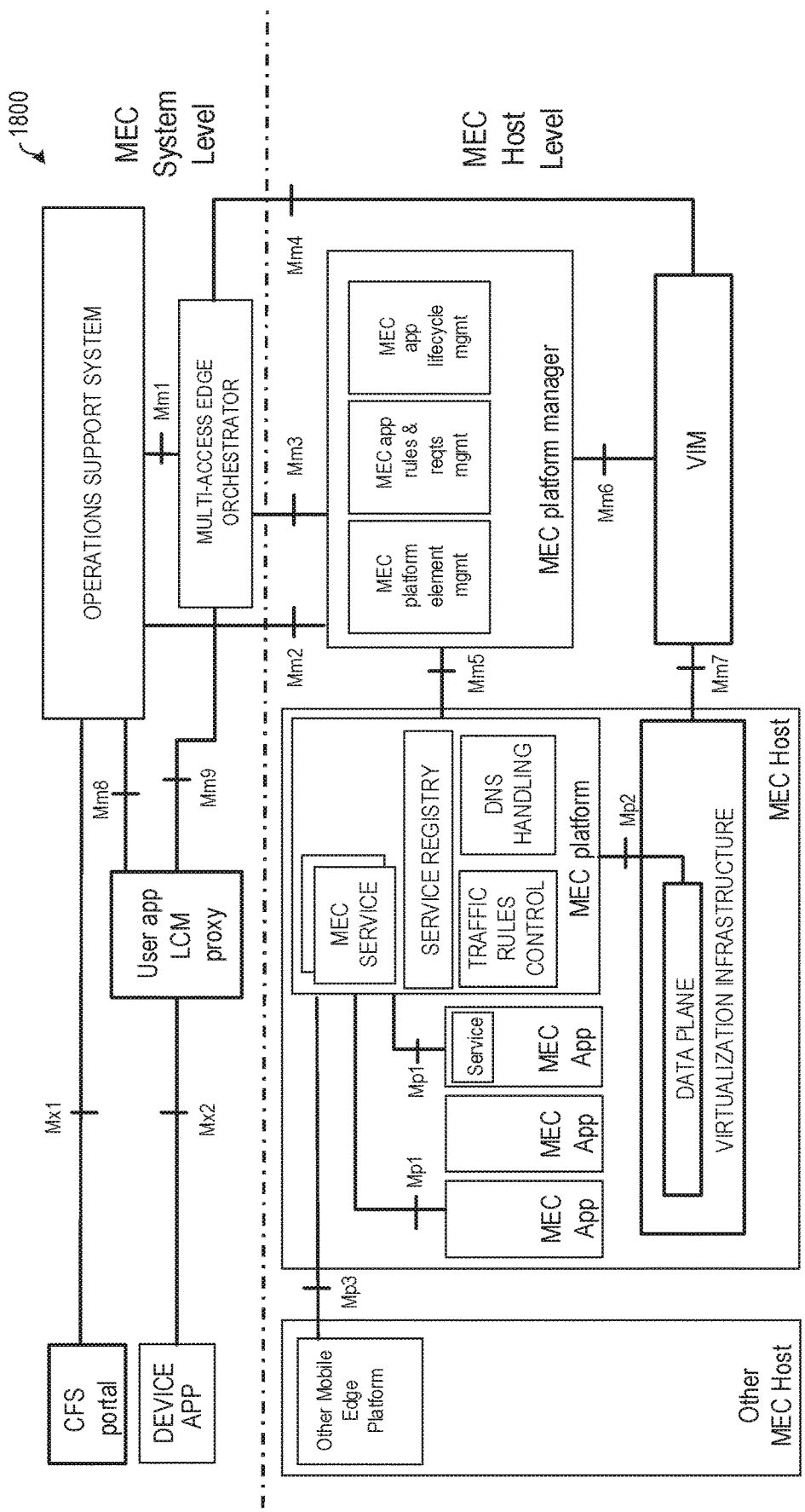
FIG. 18 illustrates an example MEC system and MEC host architecture, according to an example.

The following approaches may be used to improve security, as well as compliance, by protecting data to trusted endpoints, whether the endpoint is on the user's device (e.g., as shown in FIG. 16, discussed below), in the infrastructure as a MEC app (e.g., as shown in FIG. 18, discussed below), stored in MEC repository (e.g., as shown in FIG. 17, discussed below), or on a MEC gateway or on a MEC service host (e.g., as shown in FIG. 16, discussed below). Any configuration of endpoints determined to be consistent with a single tenant scope, such as involving resources accessible by the single tenant, may be isolated from other tenants in a multi-tenant system such that tenants may be mutually untrusted and where the MEC system provides isolation of resources and data. Isolation may consist of cryptography, physical protection of keys, and trusted execution environment technology that isolates use of keys, manipulation of data and execution of code. As will be understood, security and isolation of tenants in a multi-tenant hosting environment is an important quality component to QoS. Resource allocation and QoS may be accomplished with the present techniques in a way that does not violate tenant isolation semantics, even though there are multiple tenants, and even as resources may migrate and endpoints may be reconfigured.

As an overview, the problems addressed and solutions disclosed are applicable to various types of mobile device networking implementations (including those applicable to Edge, IoT, or Fog computing scenarios, and in scenarios where such mobile devices operate at fixed locations for periods of time). These may benefit a variety of mobile device use cases involving user equipment (UE) in mobile network communications, and in particular, in automotive use cases termed as V2X (vehicle-to-everything), vehicle-to-vehicle (V2V), and vehicle-to-infrastructure (V2I). As with typical edge computing installations, the goal with the present configuration is to bring application endpoints and services as close to the endpoints (e.g., vehicles, mobile devices), as possible, and improve the performance of computing and network resources, to enable low latency or high bandwidth services. The present techniques thus may be considered as helping ensure the reliability and availability of services, and the efficient usage of computing resources (in a variety of forms, at both requesting and serving devices).

The following systems and techniques may be implemented in, or augment, a variety of distributed, virtualized, or managed environments. These include environments in which network services are implemented within using MEC platforms, network function virtualization (NFV), or fully virtualized 4G/5G network configurations. Additionally, reference is made in various examples to LTE, 5G, eNBs, gNBs, and like radio access network concepts, but it is intended that the present techniques may be utilized with variations or substitution of the type of network deployed. For example, solutions referencing LTE may also be applicable in new radio (NR)/5G or like next generation systems.

Figure 1:
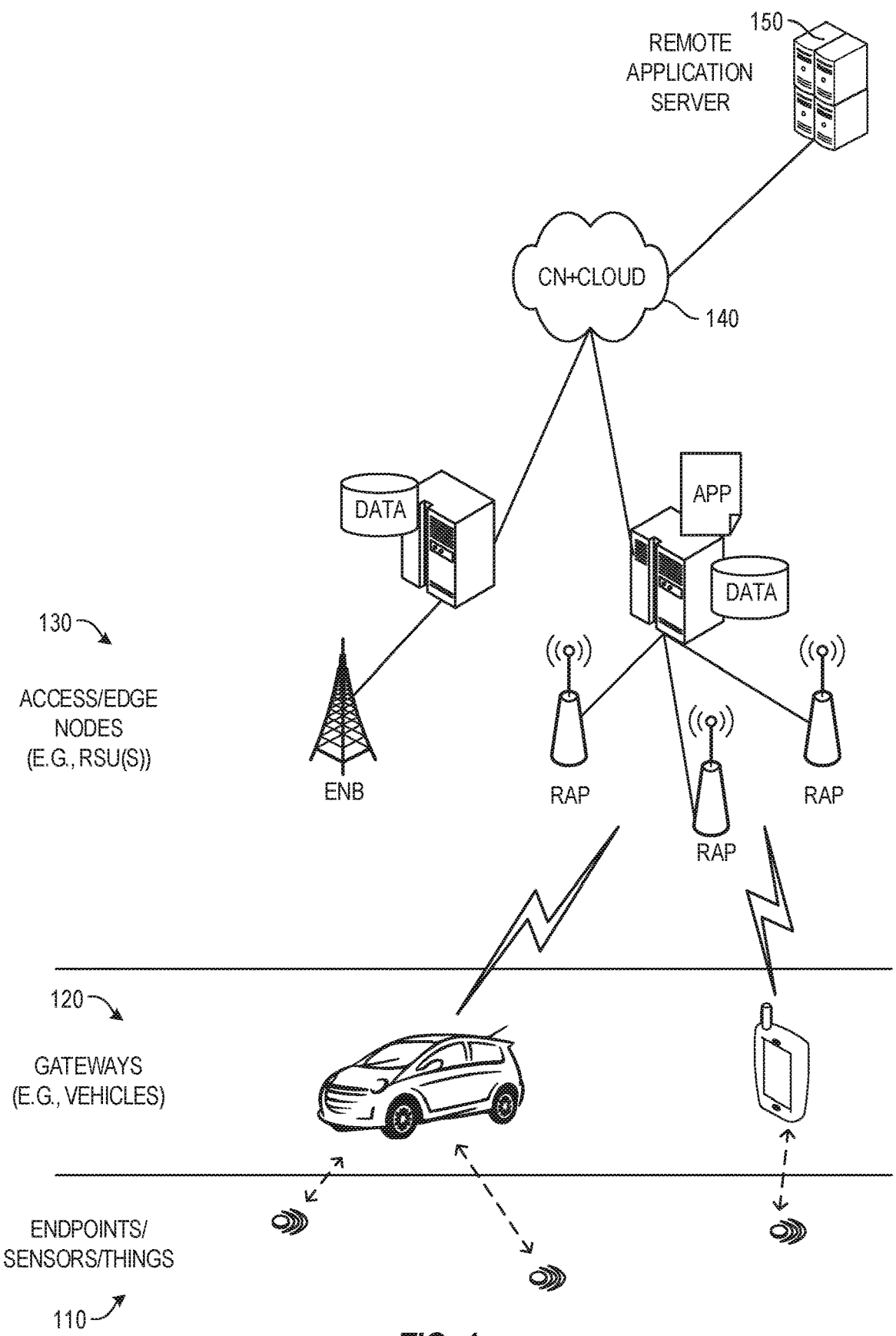
FIG. 1 illustrates devices and network entities in a dynamic communications environment, according to an example.

FIG. 1 illustrates devices and network entities in a multi-access communications environment, applicable to the present QoS management techniques. FIG. 1 specifically illustrates the different layers of communication occurring within the environment, starting from endpoint sensors or things 110 (e.g., operating in an IoT network topology); increasing in sophistication to gateways (e.g., vehicles) or intermediate nodes 120, which facilitate the collection and processing of data from endpoints 110; increasing in processing and connectivity sophistication to access or edge nodes 130 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 140. Indeed, the processing at the core network or cloud setting 140 may be enhanced by network services as performed by a remote application server 150 or other cloud services.

As shown, in the scenario of FIG. 1, the endpoints 110 communicate various types of information to the gateways or intermediate nodes 120; however, due to the mobility of the gateways or intermediate nodes 120 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. Because the operational environment may involve aspects of V2X, V2V, and V2I services from vehicle user equipment (vUE) or human-operated portable UEs (e.g., mobile smartphones and computing devices), significant complexity exists for coordinating for computing services and network usage.

Figure 2:
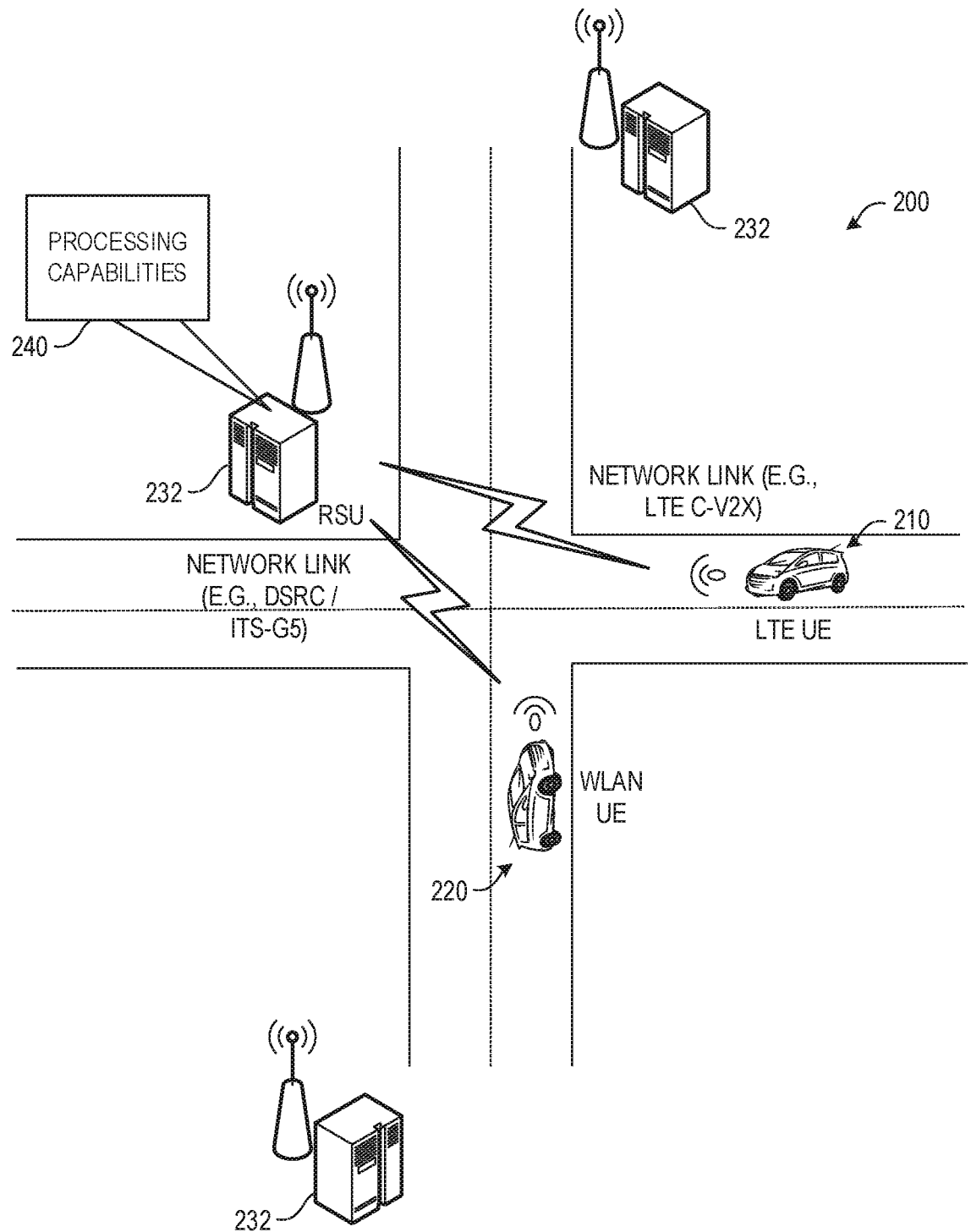
FIG. 2 illustrates an operative arrangement of network and mobile user equipment, according to an example.

FIG. 2 illustrates an operative arrangement 200 of network and vehicle user equipment, in which various embodiments may be practiced. In arrangement 200, vUEs 210, 220 may operate with a defined communication system (e.g., using a LTE C-V2X WWAN, or a SRC/ETSI ITS-G5 (WLAN) communication network, etc.). In embodiments, a Road Side Unit (RSU) 232 may provide processing services 240 by which the vUEs 210 and 220 may communicate with one another (or to other services), execute services individually and with each other, or access similar aspects of coordinated or device-specific edge computing services. In embodiments, the processing services 240 may be provided by a MEC host (e.g., an ETSI MEC host), MEC platform, or other MEC entity implemented in or by hardware of the RSU 232. In this example, the RSU 232 may be a stationary RSU, such as an eNB-type RSU or other like infrastructure. In other embodiments, the RSU 232 may be a mobile RSU or a UE-type RSU, which may be implemented by a vehicle (e.g., a truck), pedestrian, or some other device with such capabilities. In these cases, mobility issues can be managed in order to ensure proper radio coverage of the applicable services. For instance, mobility may be managed as the respective vUEs 220, 210 transition from, and to, operation at other RSUs, such as RSUs 234, 236, and other network nodes not shown.

Proactive Reservation of Edge Compute Resources. As a first scenario, edge computing QoS optimization techniques may be applied to achieve a proactive reservation of edge computing resources, based on a mobility path for a user of such edge computing resources. As a simplified example, consider a use case where a mobile computing user is driving in a car, using edge computing services offered from resources at a particular wireless network base station. The geographic path of the car is known based on an expectation of a route plan (e.g. a map service route planner) and near-real-time global positioning system (GPS) coordinate feedback (e.g., captured by a mobile computing device), provided to an edge computing service orchestrator. As the device transitions from the wireless coverage area of one base station to another, the predicted path may be proactively switched to another set of resources offered by computing services executed by other base stations or network equipment.

In an example applicable to vehicle user equipment, context-appropriate services may be supplied to the vehicle occupants based on the knowledge of other points of interest found at the same geographic location, or along a route in which the vehicle is traveling. The expected or requested edge computing services may be reserved, in advance of actual use, to ensure timely availability. This form of resource reservation is described herein as an "accelerator" and may apply to a variety of other compute services that may be needed given the dynamics of the planned or predicted route.

Additionally, in an example, service pre-allocation for mobility settings can be described or defined as a service level agreement (SLA) that specifies an expected service timeliness goal. Service prediction and pre-allocation may be utilized in this scenario to reduce setup and configuration latency that would otherwise exceed the timeliness window for the SLA. This consideration of a timeliness goal and SLA conditions may be particularly relevant in vehicle use cases, because a given user or user device may be travelling or roaming at high speed, and may require use of the service as soon as connectivity is available.

In these and other mobility settings, if the second edge computing node (e.g., base station) configuration is the same as the first edge computing node (e.g., contains an identical set of resources and offers identical resource availability) then a migration procedure may be simple to implement. However, if the edge computing node configuration is not the same, then a number of considerations relevant to resource and service usage may be considered in a migration process: the bandwidth, the software, the capabilities, the latency requirements, etc. Further, another consideration relevant to resource and service transition may include whether the service is already running in another node (e.g., whether the device can leverage a service that the node already has set up and is running), and what aspects of a service (including data, processing, memory resources) needs to be migrated to continue operation. These considerations are addressed by the following reservation techniques.

Figure 3:
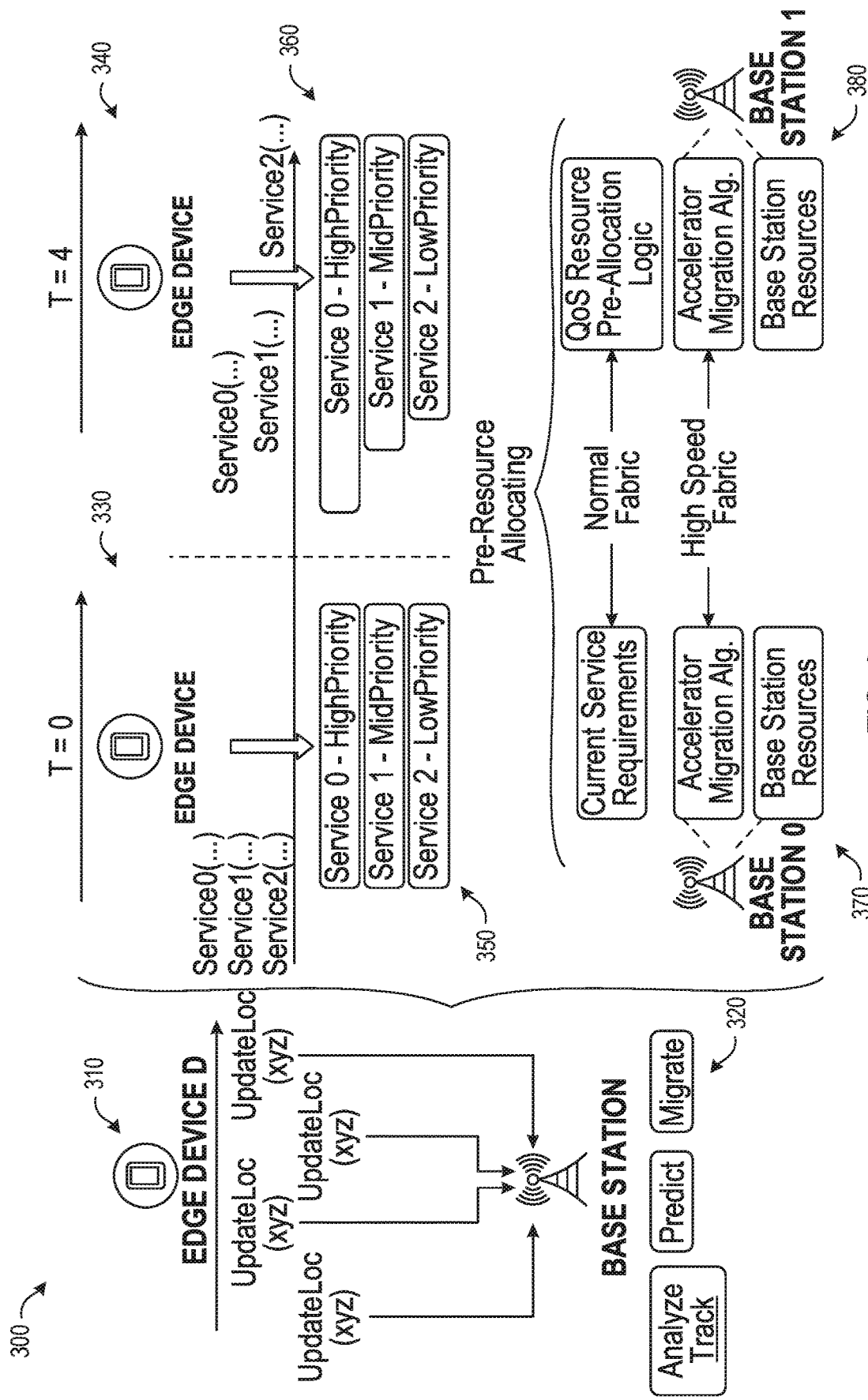
FIG. 3 illustrates a scenario for proactive reservation of edge computing resources based on device location movement, according to an example.

FIG. 3 illustrates an example scenario 300 of proactive reservation of edge computing resources based on device location movement, according to an example. As shown, the scenario 300 depicts the interaction between an edge device D 310 and a base station 320, to perform location monitoring operations. Over a period of time, the edge device D 310 provides device location update data to the base station 320, and the base station 320 performs functions to analyze a movement (or geographical track) of the edge device D 310, predict location of the movement (or geographical track) of the edge device D 310, and migrate services for use by the edge device D 310 (based on the analysis and prediction).

As a specific example, depicted in the scenario 300, consider a use case where the edge device (e.g., a UE such as a smartphone) consumes three services, Service 0, Service 1, Service 2, each of which is associated with a respective priority: Service 0, having a high priority for use by applications on the edge device; Service 1, having a medium priority for use by applications on the edge device; Service 2, having a low priority for use by applications on the edge device. In the service configuration 350 occurring at time 0 330 (T=0), the device is in the coverage area of base station 0 370, and consumes all three services. In the service configuration 360 occurring at time 4 340, the device has moved into the coverage area of base station 1 380 (and away from the coverage area of base station 0 370), but is able to continue to consume all three services.

Although the service configuration 350 depicts all three services being launched and executed concurrently with each other, such as where resources for all three services are immediately available at base station 0 370, assume a case where resources for all three services are limited at the second base station, and so all three services cannot be made immediately available at base station 1 380. As a result, the service configuration 360 operates to proactively launch the services in order of their priority: launching the highest priority service first (Service 0), the next highest priority service (Service 1), and the lowest priority service last (Service 2), before the services are needed. As a result, the order of the migration and usage of the services by the edge device at time 4 340 may be staggered or delayed; however, by the time the edge device is ready to begin use of the service from the base station 1 380, the service configuration 360 has made all three services available.

The types of services applicable in the service configurations 350, 360 may include any number of information services (vehicle data, navigation, entertainment, augmented/virtual reality, artificial intelligence processing), including services of the same type or offered by the same service provider. In particular, pre-allocation of services in the service configurations 350, 360 may involve a service that requires data and processing on an ongoing basis (e.g., from a mobile user who is driving through different edge instances), where updated information is computed in the service by edge cloud resources and provided back to a user device.

FIG. 3 further shows functional operations performed at the respective base stations 370, 380 to perform the pre-resource allocating. These operations may include the communication of current service requirements (e.g., communicated via a normal network fabric) from a source base station to a target base station, to be interpreted by QoS resource pre-allocation logic; and communication of values by an accelerator migration algorithm (e.g., communicated via an interconnect such as an high speed fabric). Other types of information may be communicated between base stations 370, 380, including regarding the resources or configurations of the respective base stations or services offered therein. Specific examples of resource allocations may include CPU, memory, archival storage, temporary storage, network bandwidth, network switches, field programmable gate array (FPGA) bitstreams, accelerator application specific integrated circuits (ASICs). Resource allocations may be expressed in terms of service utilization expectations including orchestration services, device management services, security management services, load balancing services, telemetry services, and the like.

The resources to be reserved may relate to processing or memory resources (e.g., computing processor cores, generation of hardware, accelerators, processing capabilities, memory storage space), bandwidth or processing time resources (e.g., to meet a time requirement), or any other QoS criteria that is quantifiable by use of the resources. This reservation may occur in a static or dynamic manner, but also may be managed to enable allocation of resources in a manner similar to how a function-as-a-service (FaaS) is deployed. In further examples, reservation of resources (proactively, or otherwise) may include access to security functionality including cryptography, entropy, isolated execution and management services such as key management, software update management, and device lifecycle management services.

In a further example, smart contracts or like configuration data may be used for management or tracking of resource allocation and migration data, including relating to the type of service, resource, or for the management of service operation or resource usage. For example, smart contracts used by an edge device may deposit blockchain tokens in a base station processing node as a way to pay for edge route planning and travel accommodation services. A blockchain or other distributed data ledger may also be used to track resource usage, service deployments, and like information for auditing, analysis, and the like.

Figure 4:
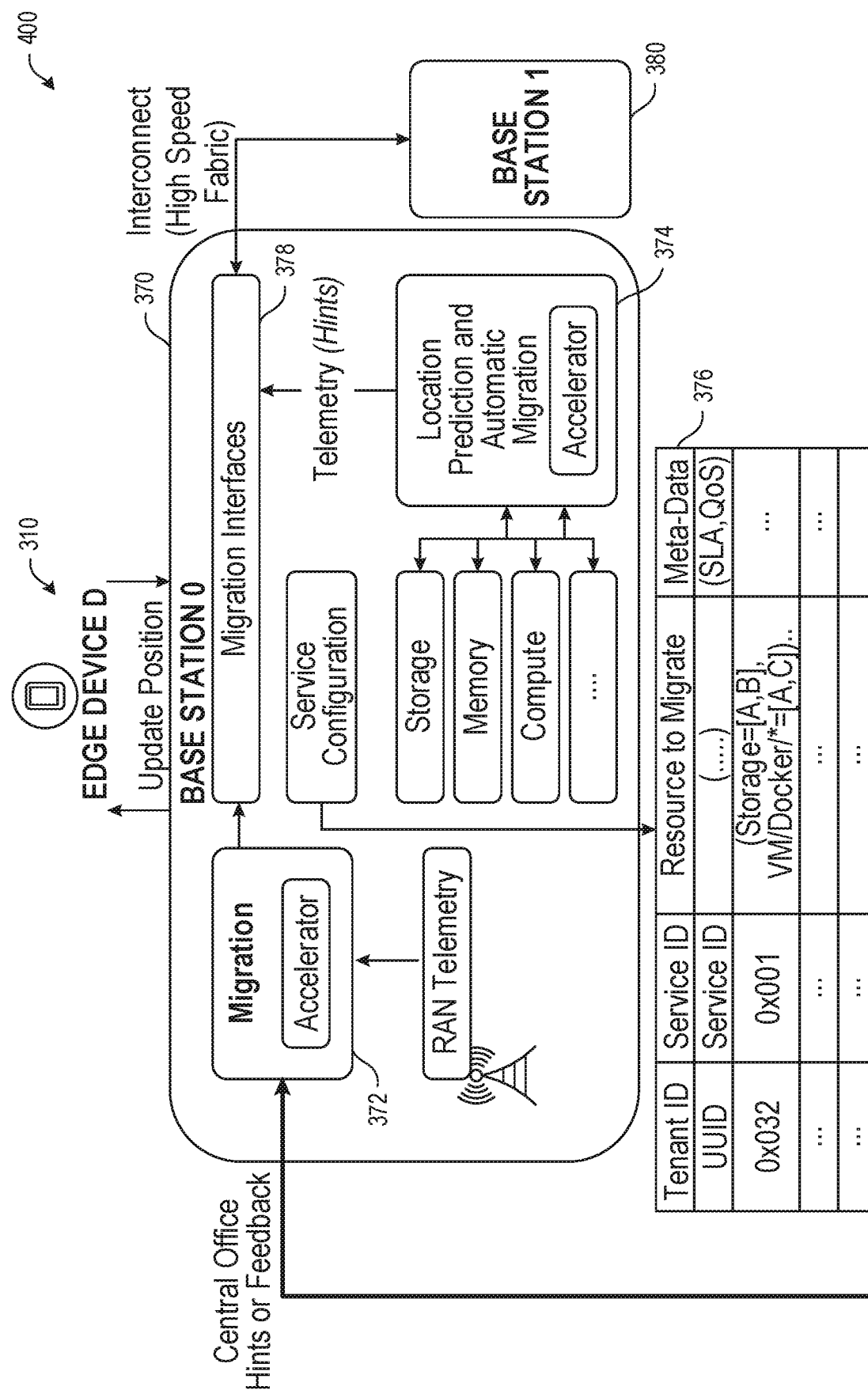
FIG. 4 illustrates an information flow for the proactive reservation of edge computing resources based on device location movement, according to an example.

FIG. 4 illustrates an information flow scenario 400 for the proactive reservation of edge computing resources based on device location movement. The scenario 400 provides a further illustration of the functionality and components depicted in FIG. 3. As shown in scenario 400, the base station 0 370 includes migration functionality 372 used to manage and initiate the migration of respective services, based on RAN telemetry. Specifically, RAN telemetry data may be received and processed by the migration functionality 372, such as the analysis of data for the services used by the UE, the signal strength and movement of the UE, etc. The base station further includes a migration interface 378 to facilitate the migration with another base station; location prediction and automatic migration functionality 374 to coordinate the handoff of storage, memory, and compute resources; and a service configuration linked to service configuration data 376 indicating the usage and configuration of respective services and service resources to migrate.

In an example, the service configuration data 376 may be recorded or managed in a data structure or data mapping. For instance, a data mapping may define information relevant for service migration such as: a tenant identifier; a service identifier; an identifier of a resource to migrate; an identifier of metadata (e.g., metadata relevant to an SLA or QoS condition). These tracked values may be used as part of parameters that transition a particular service or service instance from operation on the base station 0 370 to operation on the base station 380. Although not shown, this service configuration may be provided or communicated in whole or in part via the migration interfaces 378, as communicated to the base station 1 380 via an interconnect such as a high speed fabric. Accordingly, the location prediction and automatic migration functionality 374 may communicate information to track and then enable the pre-emptive reservation and startup of the respective resources at base station 1 380 as location movement and migration conditions are identified.

Figure 5:
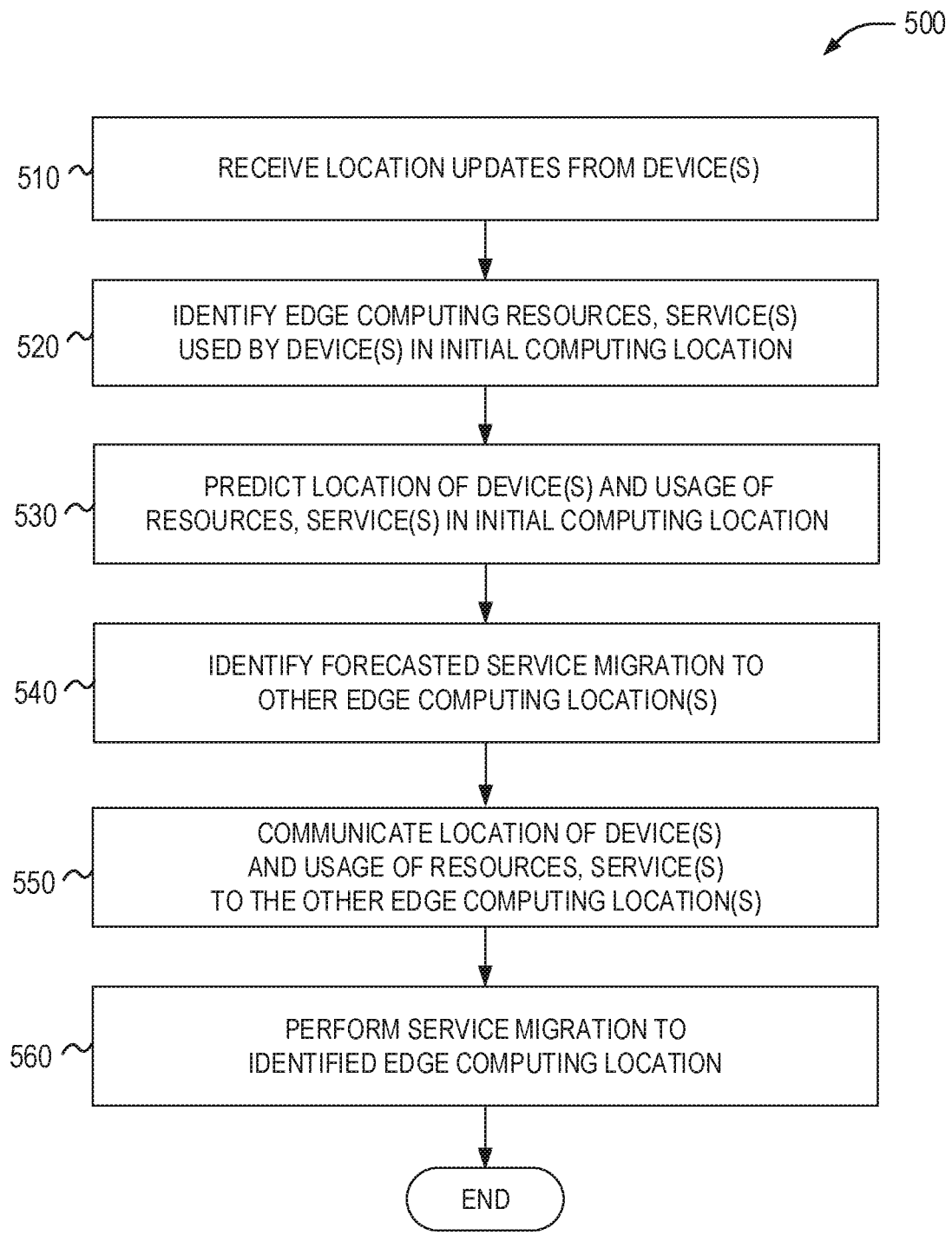
FIG. 5 illustrates a flowchart of an algorithm used for implementing proactive reservation of edge computing resources, according to an example.

FIG. 5 illustrates a flowchart 500 of an example algorithm used for implementing proactive reservation of edge computing resources. The operations of flowchart 500 are depicted from the perspective of an initiating (source) computing system, such as a base station or other edge computing node, which operates a subject service and functionality (e.g., with the configurations depicted in FIGS. 3 and 4). However, it will be understood that the algorithm in flowchart 500 may be adapted for operations on other entities, or by a coordinating entity (e.g., orchestrator) managing a plurality of edge computing nodes.

The flowchart 500 begins with operations at 510 to receive location updates from one or more devices (e.g., UEs) in communication with the computing system. These location updates may be based on direct location updates (e.g., GPS locations), location service tracking, network usage or telemetry, etc. As location is tracked, the operations at 520 proceed to identify and track edge computing resources (e.g., storage, processing, memory, bandwidth, etc.) used by the devices at the tracked locations. The usage of the service at an initial edge computing location (or locations, e.g., in the coverage area of a base station) is then followed by the following operations to detect a migration condition and migrate usage to another edge computing location.

The flowchart 500 continues at 530 with operations to predict the location of the tracked devices, and the usage of resources and services in the initial location(s), and at 540 to identify conditions in which the service(s) will require migration to other computing locations. These other computing locations may be selected based on the type of resources needed to continue services at a particular service level, based on expected location and availability of network connectivity, or other service or computing considerations.

The flowchart 500 concludes at 550 with operations to communicate the location of the device(s), and the usage of resources, service(s), and relevant migration data to the other computing locations. This enables the other computing locations to proactively allocate resources to services, using the techniques discussed above. Upon the detection of a migration condition, the service migration is completed, at 560, to transition the availability and usage of the service by the relevant device(s) to the service migrated to the identified edge computing location.

Deadline-driven Resource Allocation. In an example, edge computing resources may be allocated or established as part of a deadline-driven compute resource allocation process. This allocation process may enable an edge computing system to act in advance of a deadline needed for service usage, to fully set up or allocate resources to the correct server (e.g., a MEC server) for utilization by the service.

For instance, consider a scenario where a mobile device needs to upload and process 1 GB of data quickly with a given service function, and the mobile device is traveling in a particular direction at a particular rate of speed. If two base stations are available, the first base station predicts when the device is in the operational range of the next base station, and where a transition to the second base station must occur to maintain radio coverage (a deadline in which radio coverage at the first base station ends). In these and other scenarios, variability in content and service usage may be assisted through speculative or predictive resource allocation driven by one or more deadlines, targets, or goals.

As will be apparent, the adaptation of a resource configuration to a deadline, target, or goal may enable preprocessing based on the data and service type, and a determination/evaluation of whether resources exist to satisfy an SLA. The management of such resources may also involve setting up QoS channels and actions between base stations, with capabilities to reallocate and move resources at a given point in time. Thus, in addition to the previous examples considering mobility and location transitions in the context of edge computing services, the following also considers the application of deadlines to perform such transitions.

Figure 6:
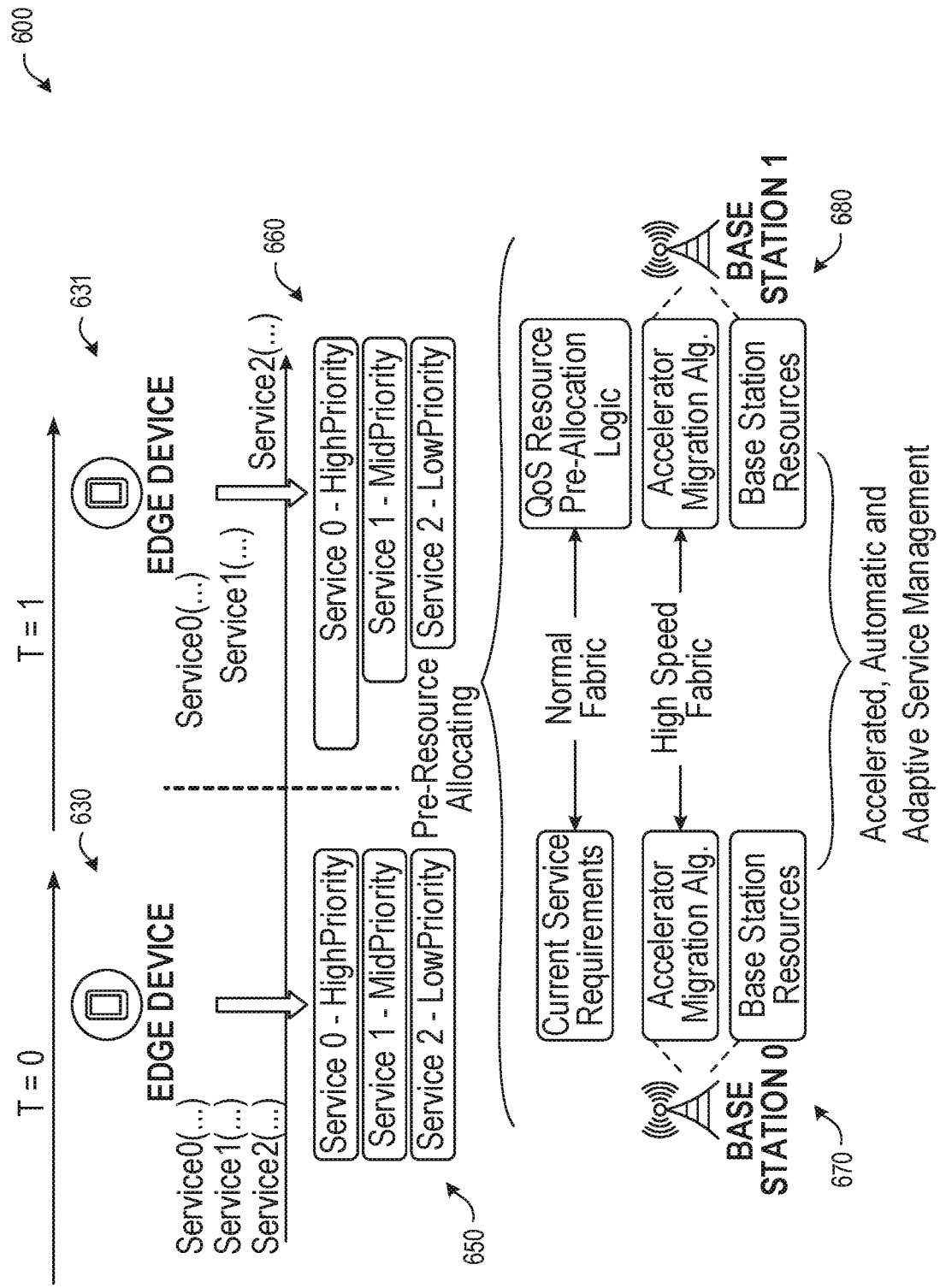
FIG. 6 illustrates a scenario for deadline-based allocation of edge computing resources, according to an example.

FIG. 6 illustrates a scenario 600 for a deadline-based allocation of edge computing resources. Specifically, the scenario 600 depicts an architecture which handles priority-based usage due to demand over time. The scenario 600 depicts a use case in which an edge device transitions from consuming a first set of services 650, at a first time (T=0) 630 with the use of the first base station 670 (BS0), to consuming a second set of services 660, at a second time (T=1) 631 in connection with use of the second base station 680 (BS1).

In this scenario, the computing resources of the base stations 670, 680 coordinate to predict a deadline in which the computing resources need to be migrated from a first location (base station 670) to a second location (base station 680). This transition and deadline results in a type of built-in service level, as migration of services and adaptation of resources (to support all ongoing services) occurs automatically. In essence, a deadline for use and continuation of a particular resource (exposed through a service) at another location becomes a characteristic of an SLA.

The use of deadline-driven resource allocation may occur in with replicated terms and data, along the predictive path of where the mobile user agent is moving. In particular, mobile device and V2X use cases have the potential of accurately predicting the path (especially if an automobile involves a mapping capability) and tracking known route information while receiving real-time location updates. If the route is not planned, speculative resource allocation may be used to analyze the historical context of similar situations or similar users, identifying where a user device traveled. In this manner, accelerated, automatic, and adaptive service management may operate to replicate services or capabilities, and to free up resources along the paths that were not taken.

The use of a deadline-driven resource allocation may occur in combination with other service implementations and ongoing data adjustments. One such adjustment may be based on statistical measures of likely activity. For instance, consider where a user is traveling along a highway; based on known activities, there may be a 95% chance that the user will continue on the route on the highway, and a handoff will be required from cell tower A to cell tower B; there is only a 5% chance that the user will stop along the route, or take an alternate route. As a result, resources may be pre-allocated and data pre-cached at base station B before the deadline is reached when the device leaves the coverage area of base station A.

The use of deadline-driven resource allocation may also consider allocation in scenarios where a deadline is not (or cannot) be met—such as when transitioning to another edge computing resource that is not able to fully allocate resources (e.g., being unable to process or receive all data required, unable to spin up enough VMs, etc.). In incomplete or partial failure scenarios, fallback provisions may be established to enable a service to be continued for a certain amount of time at the originating computing node, such as using a higher QoS communication link with inter-tower communications. Individual base stations, for instance, may use a number of backhaul or LAN connection types to communicate data at a high priority. In another example, if migration is unsuccessful, or network conditions indicate an unexpected or abnormal amount of data, services, or resources needed, cloud servers may be used to provide continuity. In still other examples, if a deadline-driven allocation is unable to be met, alternate types of services may be offered, discounts may be provided to a user, or failure of the service may even occur.

In addition to individual resources and services which are executed with processor resources (e.g., with general purpose computing processing circuitry, such as with Intel® instruction architecture (IA) hardware), it will be understood that other types of specialized algorithms, specialized hardware (e.g., accelerators, FPGAs), and hardware capabilities, may be considered at both source and destination, as part of many migration and deadline-driven resource allocation processes. Thus, consideration for migration may be made not only for a software state and software resource, but also the specialized hardware (e.g., FPGAs) and configurations (FPGA images, bitstreams, etc.) of the such hardware, and the types of pre-configuration or setup needed to utilize such hardware and run particular services at the edge node.

Figure 7:
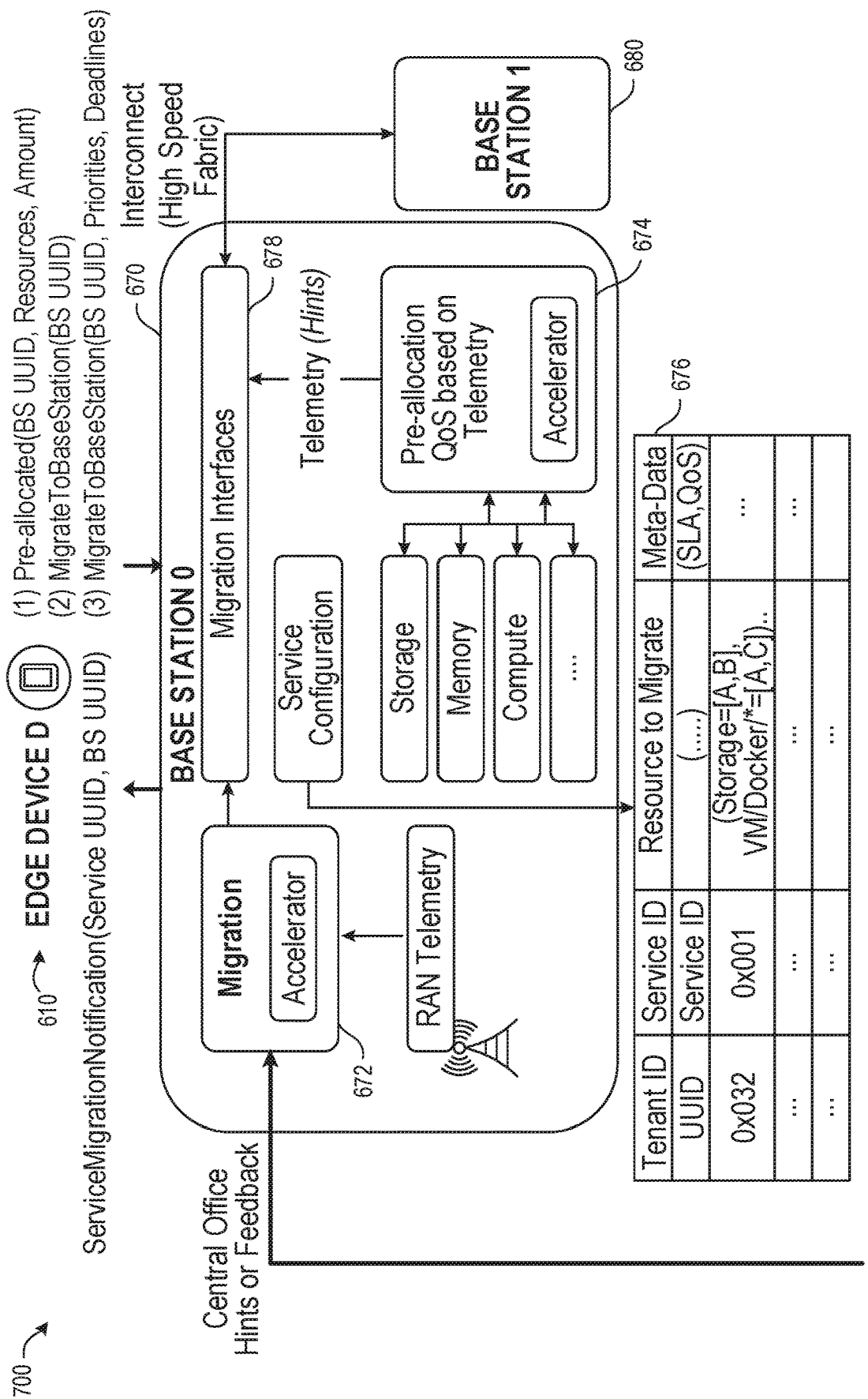
FIG. 7 illustrates an information flow for a deadline-based allocation of edge computing resources, according to an example.

FIG. 7 illustrates an example information flow 700 for a deadline-based allocation of edge computing resources. In a manner similar to the information flow 400 depicted in FIG. 4, the base station 670 includes migration functionality 672, service configuration information 676, and migration interfaces 678. The base station 670, however, includes specific pre-allocation functionality 674 designed to pre-allocate resources on a deadline-driven basis, based on telemetry. The use of the functionality 674 may be driven by information communicated between the edge device 610 and the base station 670, including a request from the edge device 610 for pre-allocated resources (e.g., in a pre-allocation function specifying the base station, resources, and amount); a request from the edge device 610 to migrate to another base station (e.g., in a request to utilize the base station); or a request from the edge device 610 to migrate to another base station with particular service requirements (e.g., in a request to utilize the base station with specific priorities, deadlines, etc.).

In further examples, the migration function may be triggered or adapted with a combination of prediction-based and deadline driven functions (e.g., using a combination of deadline-driven processing with the prediction-based techniques in FIGS. 3-5). This combination can be used in scenarios where there is a high likelihood, produced from the prediction, that the edge device will travel to a particular location, and there is a known deadline (X amount of time) to ensure that the service is set up.

Figure 8:
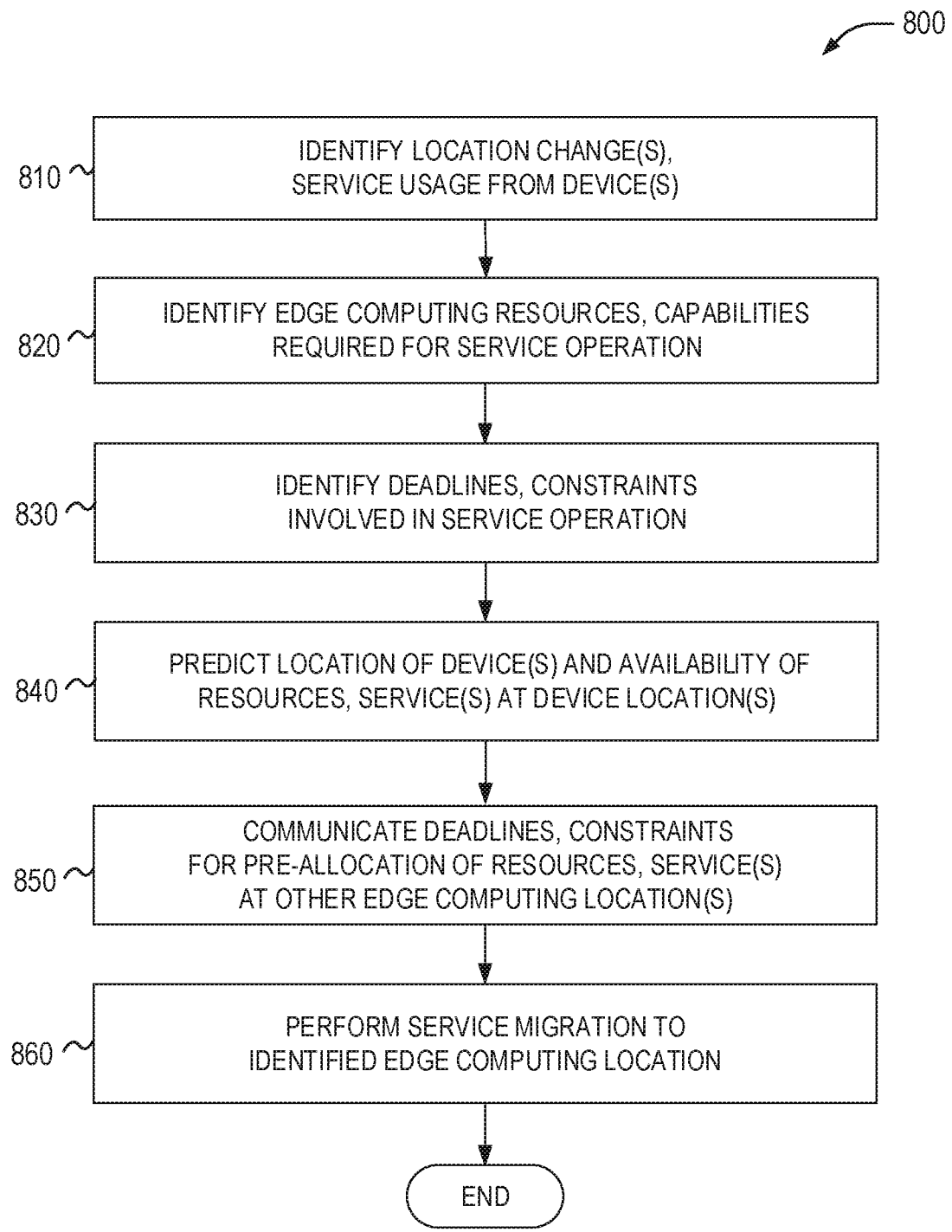
FIG. 8 illustrates a flowchart of an algorithm used for implementing a deadline-driven allocation of edge computing resources, according to an example.

FIG. 8 illustrates a flowchart 800 of an example algorithm for implementing a deadline-driven allocation of edge computing resources. Similar to the context provided above for flowchart 500, the flowchart 500 is depicted from the perspective of an initiating (source) computing system, such as a base station or other edge computing node, which operates a subject service and functionality (e.g., with the configurations depicted in FIGS. 6 and 7). However, it will be understood that the algorithm in flowchart 800 may be adapted for operations on other entities, or by a coordinating entity (e.g., orchestrator) managing a plurality of edge computing nodes.

The flowchart 800 begins with operations at 810 to identify applicable location and service information, such as by location changes or location updates, service statistics and configurations, and the like. The flowchart 800 continues with operations at 820 to identify edge computing resources and capabilities required for service operations, for one or more particular services; and operations at 830 to identify deadlines and constraints required for the service operations. The identification of this information may be established as a baseline for the types of resources and service features that need to be continued by any applicable service change deadline.

The flowchart 800 continues with operations at 840 to predict the location of devices, and the availability of resources and services at the predicted device locations. In other examples, the prediction may relate to detecting changes in the network in addition to location, such as changes to computing configurations or services, priority changes, resource unavailability, etc. Based on the prediction of the availability or similar relevant changes, applicable deadlines and constraints for the relevant service(s) are communicated at 850 to other edge computing devices and platforms, for resource pre-allocation (e.g., by utilizing the deadline-based pre-allocation and service migration techniques discussed above for FIGS. 6 and 7). The resource pre-allocation may include communication of resource information, resource utilization or amounts, system or resource configurations, and the like.

The flowchart 800 concludes at 860 with the performance of service migration operations to an edge computing location (in some examples, a predicted, identified, or recommended edge computing location). In some examples, this may include the migration of the service upon the occurrence of an event or condition; in other examples, this may include the migration of the service with applicable priorities, deadlines, etc., to continue the service at an equivalent service level.

Speculative edge QoS pre-allocation. In further scenarios, as a device is moving from a first edge computing location to a second edge computing location (or, a device is moving while committing N units of time to a service operation), edge computing resources may be coordinated to speculatively pre-allocate resources. For instance, the amount of platform resources needed at the second edge computing location may be pre-allocated to ensure that the computing operations may receive, handle, and process all data that is received, once an endpoint migrates to operations with the second computing edge location. Such pre-allocation may be utilized in settings where it is unclear which location will be used for the service, such as in a mobility scenario where a user device might travel to any one of multiple potential locations. The following techniques may be used to establish a pre-allocation of resources for multiple edge computing locations, while still utilizing a given expiration time for a service (e.g., to free up resources after M units of time).

The use of migration from one edge location to another, particularly in a wireless network context, may involve the speculative pre-allocation of resources (e.g., compute resources, memory resources, accelerators, etc.) to be coordinated among multiple locations. In scenarios where service resources are pre-allocated along multiple paths that could be used, systems located in paths that are not chosen may be notified when a migration occurs to another base station along the selected path. Thus, speculative pre-allocation may include a variety of coordination scenarios to reserve, utilize, and free up resources.

Figure 9:
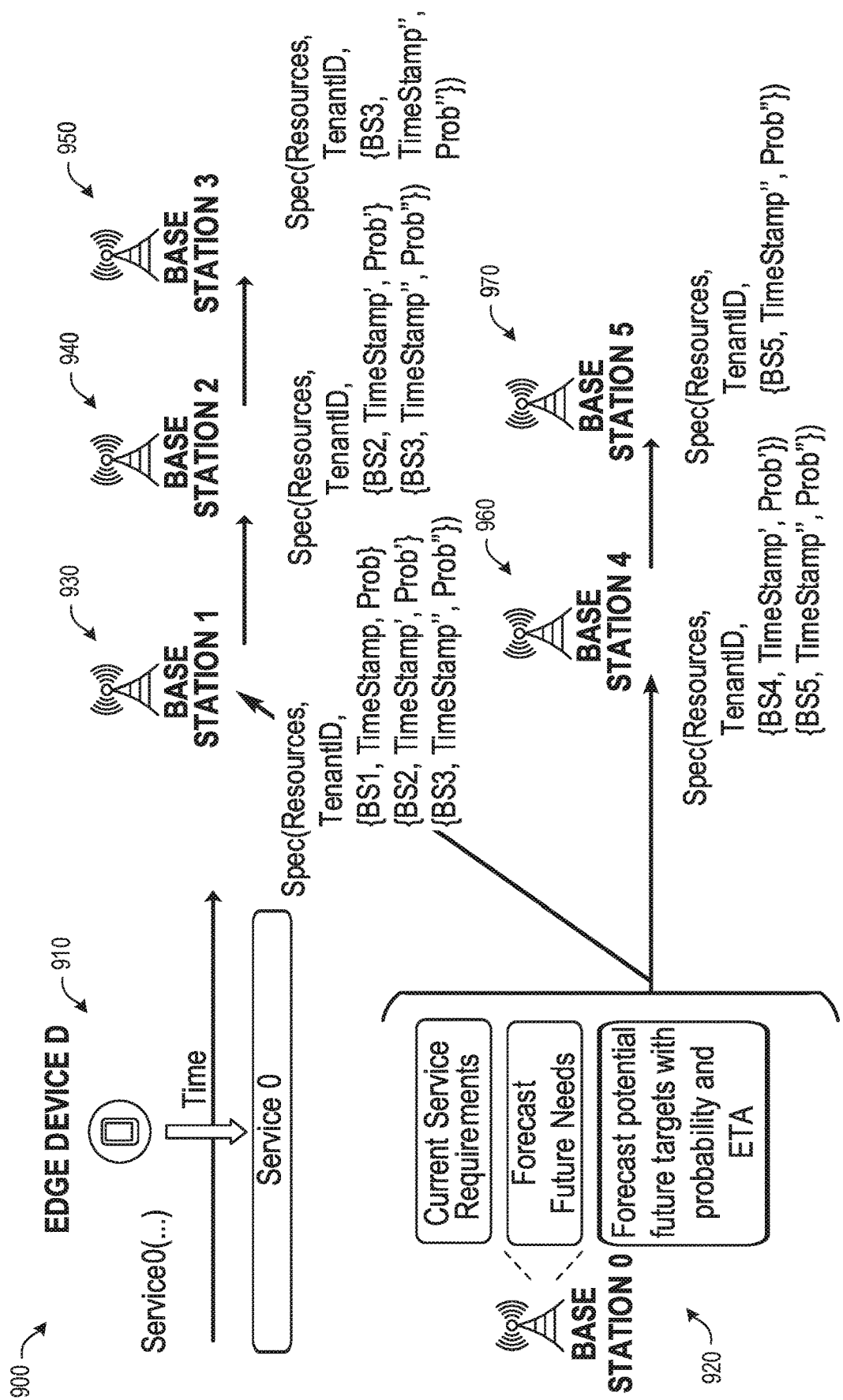
FIG. 9 illustrates a scenario for speculative QoS-based allocation of edge computing resources, according to an example.

FIG. 9 illustrates an example scenario 900 for speculative QoS-based allocation of edge computing resources. With the scenario 900, the speculative allocation of resources may be accomplished by multicast messages and notifications, targeting multiple topologies or operative areas, within the edge architecture. The operation of an edge device 910 (edge device D) with a service by a base station 920 (BS0) will consider not only current service requirements, but also a forecast of future service needs, and a forecast of potential future targets with probability and estimated time to arrive (ETA).

As shown in the scenario 900, the base station 920 may coordinate speculative allocation of resources among multiple base stations 930, 940, 950, 960, 970. This may include the communication of which resources are needed, tenant information, and projected time and probability to utilize the service, from one base station to another. For instance, base station 920 may communicate this information to base station 930, which communicates another prediction and time information to base station 940, which communicates another prediction and time information to base station 950. This same information is communicated along another path from base station 920 to base station 960, to base station 970.

The use of multi-cast messages and notifications may encounter complex communication scenarios as individual base stations attempt to coordinate distributed resource management. Such management may be accomplished through the use of communication and resource API calls, to enable an edge location to and initiate actions for pre-allocation, while coordinating resource management under centralized or decentralized control. Similar API calls may be used to identify resources, services, or network conditions that are no longer relevant (e.g., due to completion of the service or service consumer, service level changes, path changes, etc.).

In a further example, the speculative allocation of resources may be coordinated through centralized infrastructure (e.g., orchestrator), which performs a management role for the pre-allocation of resources in the network (e.g., any resource that may be assigned to the user or tenant). However, even in this setting, the management of individual resources to meet a service objective or criteria may still be delegated to the management of individual edge locations. As a result, pre-allocation of resources may include creation of tenant-specific profiles, configuration parameters, settings, and context data that may be input to a service as part of service instantiation steps. Actual memory, CPU and networking resources used to perform the service may not be allocated until the user workload is ready to run to allow optimum resource utilization while minimizing service instantiation costs.

Other variations to management, coordination, and orchestration of services and service resources may be feasible based on the service level goals and operator choices.

Figure 10:
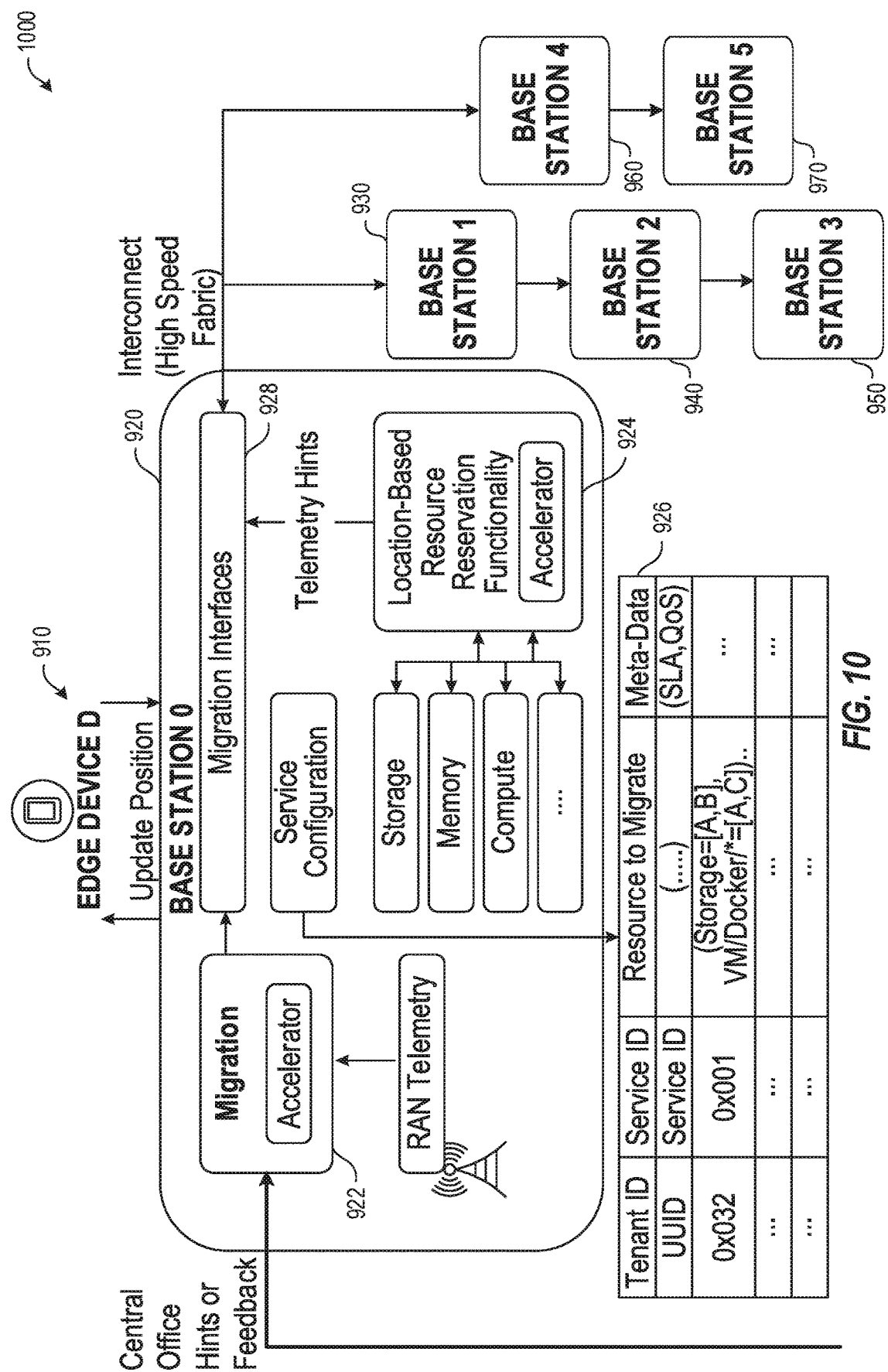
FIG. 10 illustrates an information flow for a speculative QoS-based allocation of edge computing resources, according to an example.

FIG. 10 illustrates an information flow 1000 for a speculative QoS-based allocation of edge computing resources. In this scenario, the edge device 910 provides consumes a service hosted by a first base station, base station 920 (BS0), and the base station 920 includes migration functionality 922, migration interfaces 928, and service configuration data 926 for operation of the service, in a manner similar to the scenarios 400, 700 discussed above. The base station 920, however, includes a location-based resource reservation functionality 924, which is configured for the management of speculative resources among a plurality of base stations, in multiple paths, shown as base station 930, base station 940, base station 950 in a first path, and base station 960, base station 970 in a second path.

The resource reservation functionality 924 performs an evaluation to determine a speculative prediction of which of the respective base stations will be used (or can assist) in the operation of the service, as well as which services are likely to continue operation at the respective base station. This speculative prediction may be performed with an objective to continue the service availability wherever possible, or to continue the service at a particular level of service. The resource reservation functionality 924 may also coordinate with migration functionality 922 and the migration interfaces 924 to help facilitate a handoff (e.g., migration) of the service to a particular base station in which resources have been obtained. The resource reservation functionality 924 may also manage the shutdown and reallocation (and release) of resources, if the prediction is incorrect or incomplete.

In an example, the speculative pre-allocation techniques may be adapted to handle network congestion, or immediate loss of network resources, and to avoid or reprocess zombie resources that are unused (or become unusable) by any service. Time limits and notifications may be used to identify resources that become unneeded or redundant. The use of pre-allocation or pre-registration for services may also be integrated with security concerns and functions. Since edge computing systems are constantly being re-used or re-tasked, these computing systems need to ensure a previous tenant environment is wiped clean for the next tenant. Additionally, edge computing systems are often coordinated by an orchestrator which making static (e.g., up-front) workload optimization decisions that may presume availability of resources that are one, two, or three hops away within the Edge environment. Pre-allocation and registration may involve provisioning a set of policies for how to "clean" the current workload's environment and may specify how to provision keys and security policy needed to protect the next workload.

Pre-allocation and registration may, in some multi-location scenarios, result in less than optimal use of resources. To address this problem the workload may take longer than expected at locations 1 and 2. That implies the resource at locations 3 is left idle waiting for locations 1 and 2 to complete. In further examples, recursive telemetry feedback may be added as part of the reservation protocol so that reservations can be pre-empted by another workload that is ready to run sooner.

Figure 11:
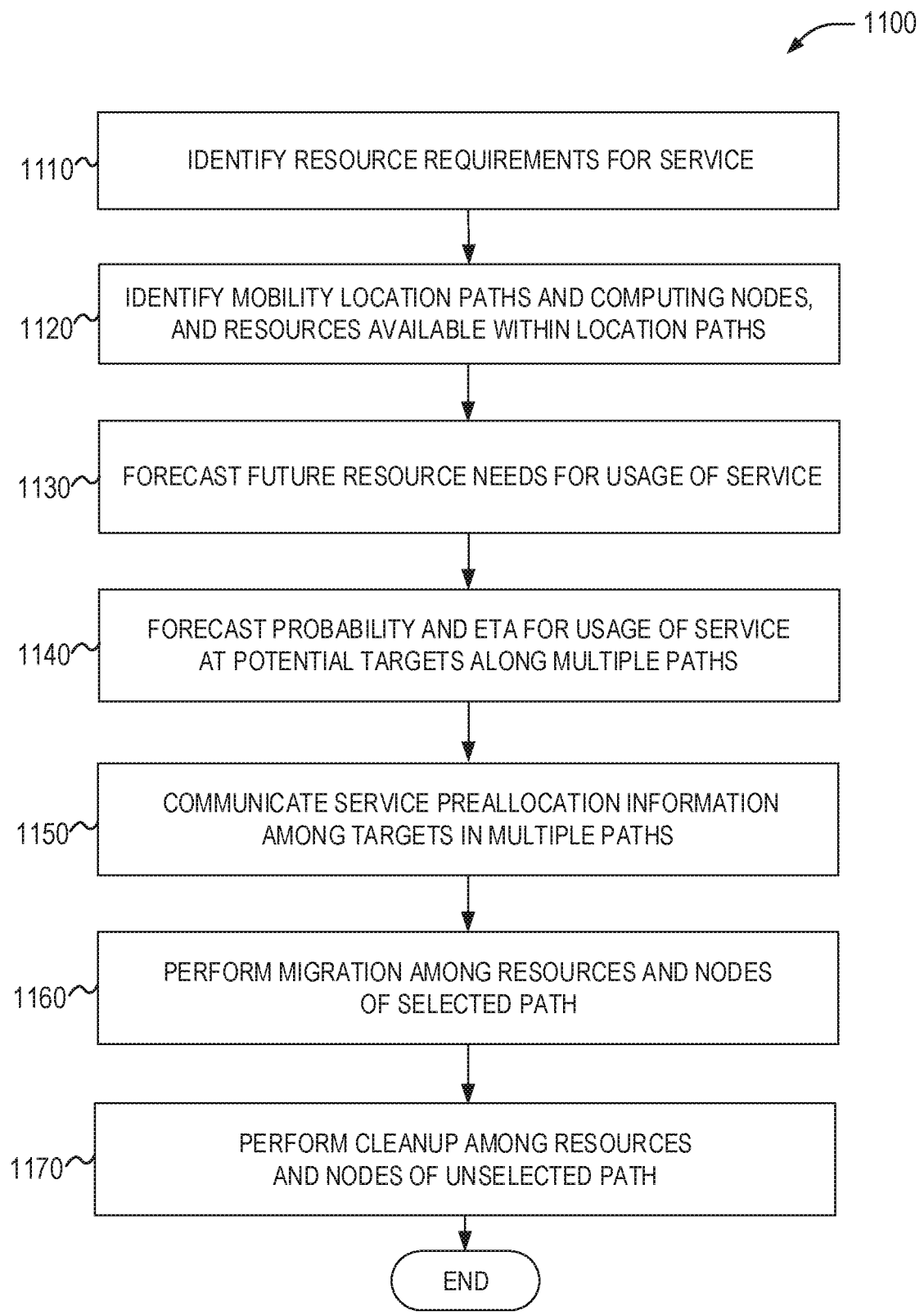
FIG. 11 illustrates a flowchart of an algorithm used for implementing a speculative QoS-based allocation of edge computing resources, according to an example.

FIG. 11 illustrates a flowchart 1100 of an example algorithm used for implementing a speculative QoS-based allocation of edge computing resources. Similar to the context provided above for flowcharts 500 and 800, the flowchart 1100 is depicted from the perspective of an initiating (source) computing system, such as a base station or other edge computing node, which operates a subject service and functionality that forecasts and communicates service needs and targets (e.g., with the configurations depicted in FIGS. 9 and 10). However, it will be understood that the algorithm in flowchart 1100 may be adapted for operations on other entities, or by a coordinating entity (e.g., orchestrator) managing a plurality of edge computing nodes.

The flowchart 1100 begins with operations at 1110 to identify resource requirements used for the applicable service. This may include configuration information used to setup particular resource settings or environments on an edge computing node. This is followed by operations at 1120, performed on an ongoing basis, which identify potential mobility location paths and computing nodes, and the resources available within such location paths. This identification may identify possible resource configurations and the types of setups needed in order to pre-allocate applicable resources.

The flowchart 1100 continues with operations at 1130 to forecast future resource needs for the usage of the service, and operations at 1140 to forecast the probability and estimated timing for usage of the service at respective targets. These forecasts may be produced for deployment of multiple targets along multiple paths, as is applicable depending on the type of the service, the rate of mobility, the direction of mobility, the type of network coverage available, etc. The predicted service pre-allocation information is communicated among target nodes in the multiple paths, at 1150, to enable speculative pre-allocation of the resources at the respective target nodes.

The flowchart 1100 concludes with operations at 1160 to perform the migration of resources and nodes, along the actual used or selected path of mobility and migration. Based on the migration performed, cleanup may be initiated and performed, at 1170, among resources and nodes of an unselected path. Other variations for migration and cleanup may be performed using the other allocation techniques discussed herein.

Automatic QoS migration across Edge Compute Nodes. In a further example, the architecture discussed herein may be extended to enable an automatic migration of a configuration usable by a service or a user among edge computing resources (e.g., from one edge station to another, such as with the mobility scenarios discussed above). In an example, a platform identifies and tracks a QoS platform configuration used at each of the resources (e.g., class of service, and configuration to achieve such class of services) for use with resources at target edge computing platforms. This information is communicated to a target edge computing platform for the use and setup of services according to the QoS configurations (and relevant settings, characteristics, etc. as used by the applicable resources, services, or users).

In an example, the target edge computing platform includes a function to convert or transpose a QoS platform configuration applied at the source computing platform, for use at the target computing platform. Such configuration information may indicate information relevant to cache capacity, memory bandwidth, network QoS, etc., as mapped between the source platform and the type of source platform to the actual QoS ingredients available on the target platform. In this manner, the QoS configuration may be deployed for a best fit for a service, even if the resources at the target platform are not identical or directly corresponding to the resources of the source platform.

Figure 12:
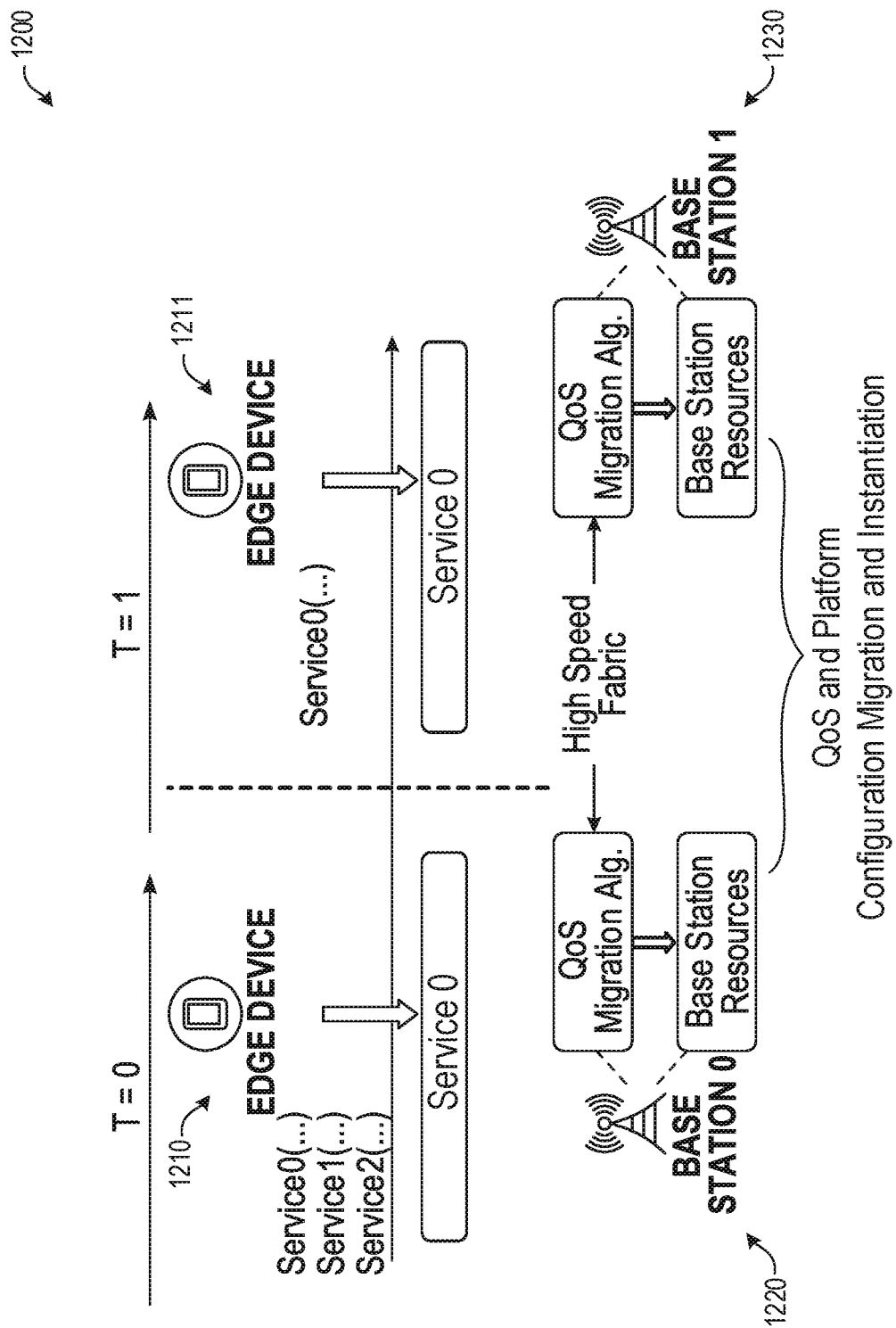
FIG. 12 illustrates a scenario for automatic QoS-based migration of edge computing resources, according to an example.

FIG. 12 illustrates a scenario 1200 for automatic QoS-based migration of edge computing resources. As shown, an edge device has a first service configuration 1210 at time 0, operating three services at base station 0 1220; and a second service configuration 1211 at time 1, operating only one service at base station 1 1230. This scenario may occur, for instance, as a result of a QoS requirement and the configuration of the respective base station (such as in a scenario where the base station 1 1230 does not have resources to perform all three services; but the service 0 is critical to continue operation at another edge device).

The selection of services to migrate (or alternately, not migrate, or discontinue, etc.), and the configuration of applicable base station resources to operate such services, may be determined via a QoS migration algorithm coordinated at one or both of the base stations 1220, 1230. This algorithm may also coordinate migration and instantiation of relevant services, resource management, and conditions relevant to a SLA or service objective. Any number of configuration settings, values, or indications relevant to QoS settings and resource or service utilization may be communicated via this channel.

In further examples, guest support software layers may be used to assist infrastructure management and transfer relevant QoS resource and service meta-data. For example, in a virtualized network function (VNF) setting, VNF descriptors may be used to easily communication of relevant QoS information in metadata fields. Various indicators of performance or service conditions (e.g., key performance indicators (KPIs)) may also be utilized to escalate migration, resource allocation, and the like.

Additionally, QoS criteria used for automatic migration may include security hardening and measures of protection, such as to identify where the source environment criteria are equal to or better than the destination environment. In such scenarios, the orchestrator or the tenant may require one or both prove expected security characteristics exist as a condition of migration.

Figure 13:
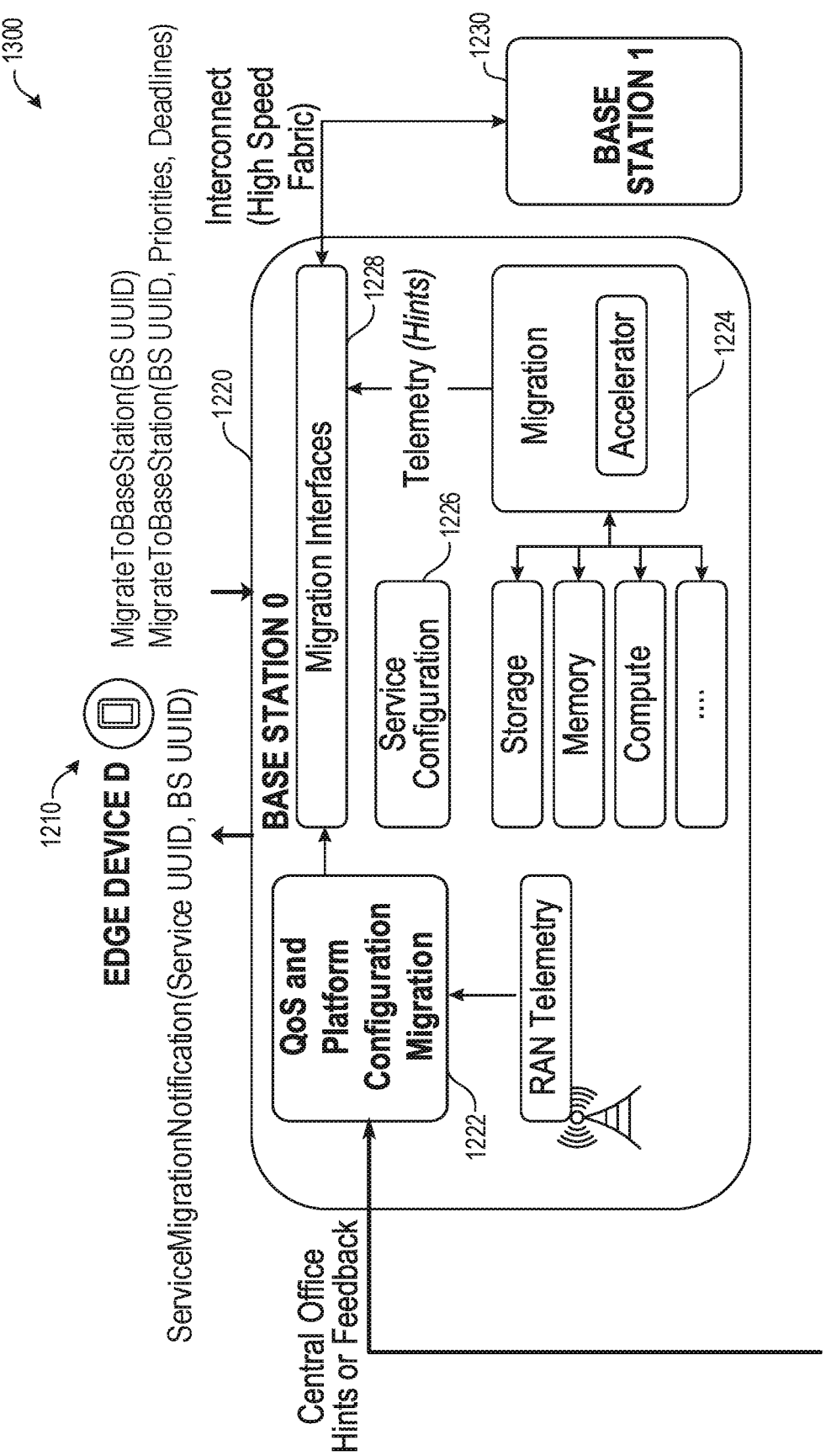
FIG. 13 illustrates an information flow for automatic QoS-based migration of edge computing resources, according to an example.

FIG. 13 illustrates an example information flow 1300 for automatic QoS-based migration of edge computing resources, providing the use of the resources discussed above with FIG. 12. In a similar manner to the information flow 700 depicted in FIG. 7 (and in information flows 400 and 1000 depicted in FIGS. 4 and 10 above), a base station 1220 operates services, and includes migration functionality 1224, a service configuration 1226, and migration interfaces 1228. In the scenario depicted with information flow 1300, however, additional QoS and platform configuration information relevant to migration may be tracked and managed within configuration migration functionality 1222. This configuration information may be directly relevant to QoS characteristics as indicated by RAN telemetry, or by operation of respective services. As noted above, such configuration information or related metadata may relate to resource features (e.g., cache capacity, memory bandwidth, network QoS, etc.) to achieve a particular service level, service operation, etc. Additionally, configuration information may be communicated as part of a request from the edge device 1210 to perform migration according to a particular set of priorities, deadlines, or related SLA/service objectives.

Further to the information flows described and depicted with reference to FIGS. 4, 7, 10, and 13, a migration interface may be adapted describe or act upon computing resources (whether relating to compute, memory, storage, or accelerator resources) that contain, access, or utilize a security resource such as a trusted execution environment (TEE). For instance, the computing resource may utilize a TEE resource where the data, function, code, and sensor inputs may be allowed conditionally according to the type, name, and strength of protection offered by the TEE.

Figure 14:
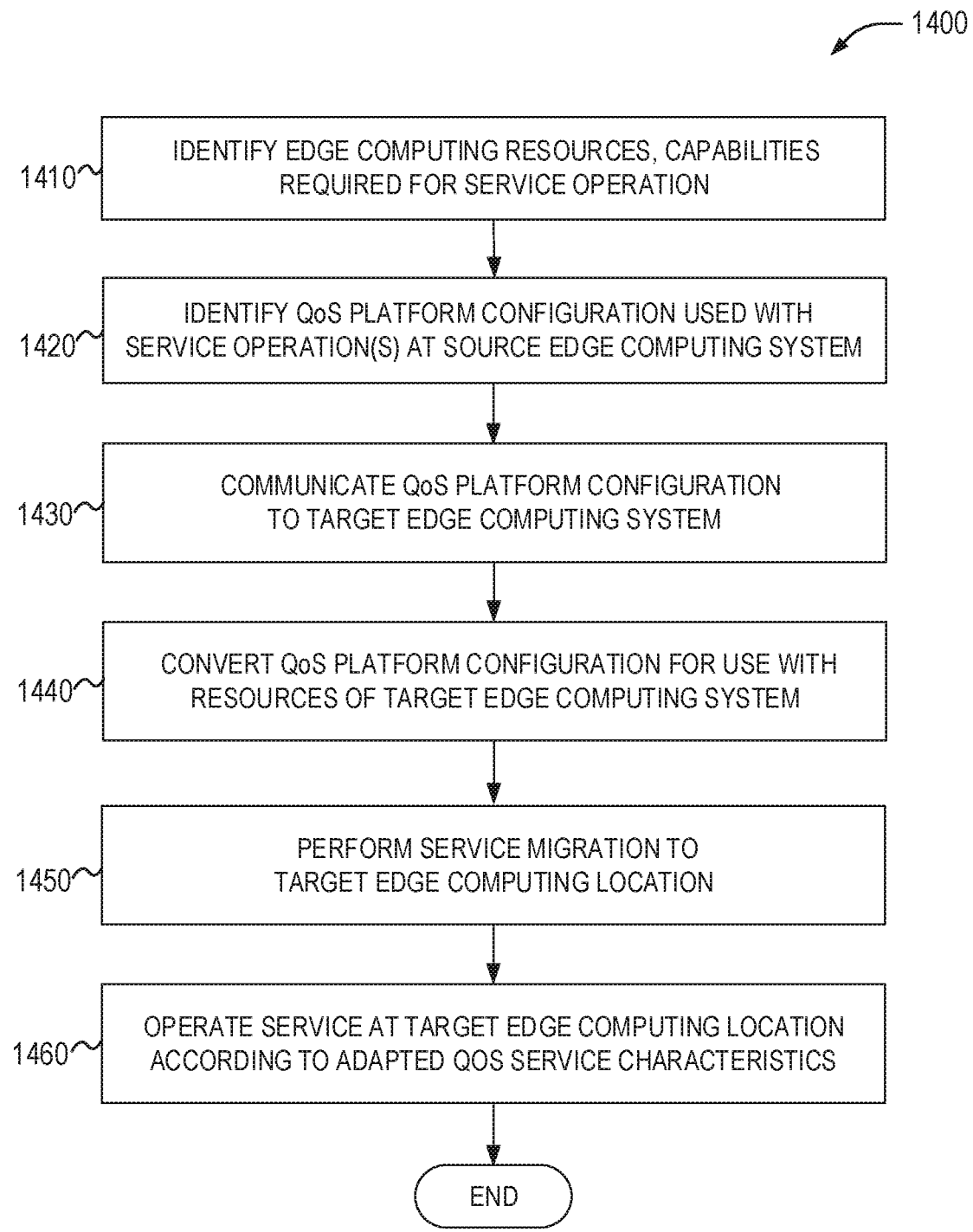
FIG. 14 illustrates a flowchart of an algorithm used for automatic QoS-based migration of edge computing resources, according to an example.

FIG. 14 illustrates a flowchart 1400 of an example algorithm implementing Automatic QoS migration among edge computing resources. The flowchart 1400 is depicted from the perspective of multiple computing entities-both an initiating (source) computing system, such as a base station or other edge computing node, and a receiving (target) computing system, such as a second base station or other computing node)—providing edge computing service migration functionality (e.g., with the configurations depicted in FIGS. 12 and 13). However, it will be understood that the algorithm in flowchart 1400 may be adapted for operations on other entities, or by a coordinating entity (e.g., orchestrator) managing a plurality of edge computing nodes.

The flowchart 1400 begins with operations at 1410 to identify edge computing resources and capabilities required for service operation (e.g., memory, processing, bandwidth, network requirements to execute the service) in an edge computing setting. This is accompanied by operations at 1420 to identify a particular QoS platform configuration (e.g., computing settings, prerequisites, etc.) used or attempted for the service in a particular source edge computing instance (e.g., hardware instance, VM, etc.). This configuration information relates to the information, specific to the source edge computing system, usable to perform the service requirements and meet the QoS level for the service.

The flowchart 1400 continues with operations at 1430 to communicate the QoS platform configuration, used at the source edge computing system, to a target edge computing system expected, predicted, scheduled, or identified to deploy the relevant service. This information may be processed and converted at 1440, by the source or target system, to properly adapt and map the configuration to the resources of the target edge computing system. This conversion may, in some examples, occur by the source computing system prior to the communication at 1430. The conversion may involve some aspects of change or adaptation, depending on the QoS service characteristics and the types of resources available for QoS considerations.

The flowchart 1400 concludes with operations at 1450 to conduct the service migration to the target edge computing location, and then operate the service at the target edge computing location at 1460 according to the adapted QoS service considerations. In further examples, aspects of prediction, pre-allocation, and deadline-driven migration (e.g., discussed with reference to FIGS. 3 to 11) may be incorporated with the use of adapted QoS service considerations.

In many of the examples discussed herein, migration should be tenant-specific and include migration of security context including cryptographic keys. Such migration, however, may also involve identifying "security equivalent" environments. For example, if a first environment is constructed using a trusted execution environment (e.g. Intel SGX) on a first node, but the migration target node does not support TEE capabilities, a security equivalent must be found (or a decision not to migrate made). Thus, consideration may be provided to orchestrator policies that define "acceptable" mappings and security requirements.

Figure 15:
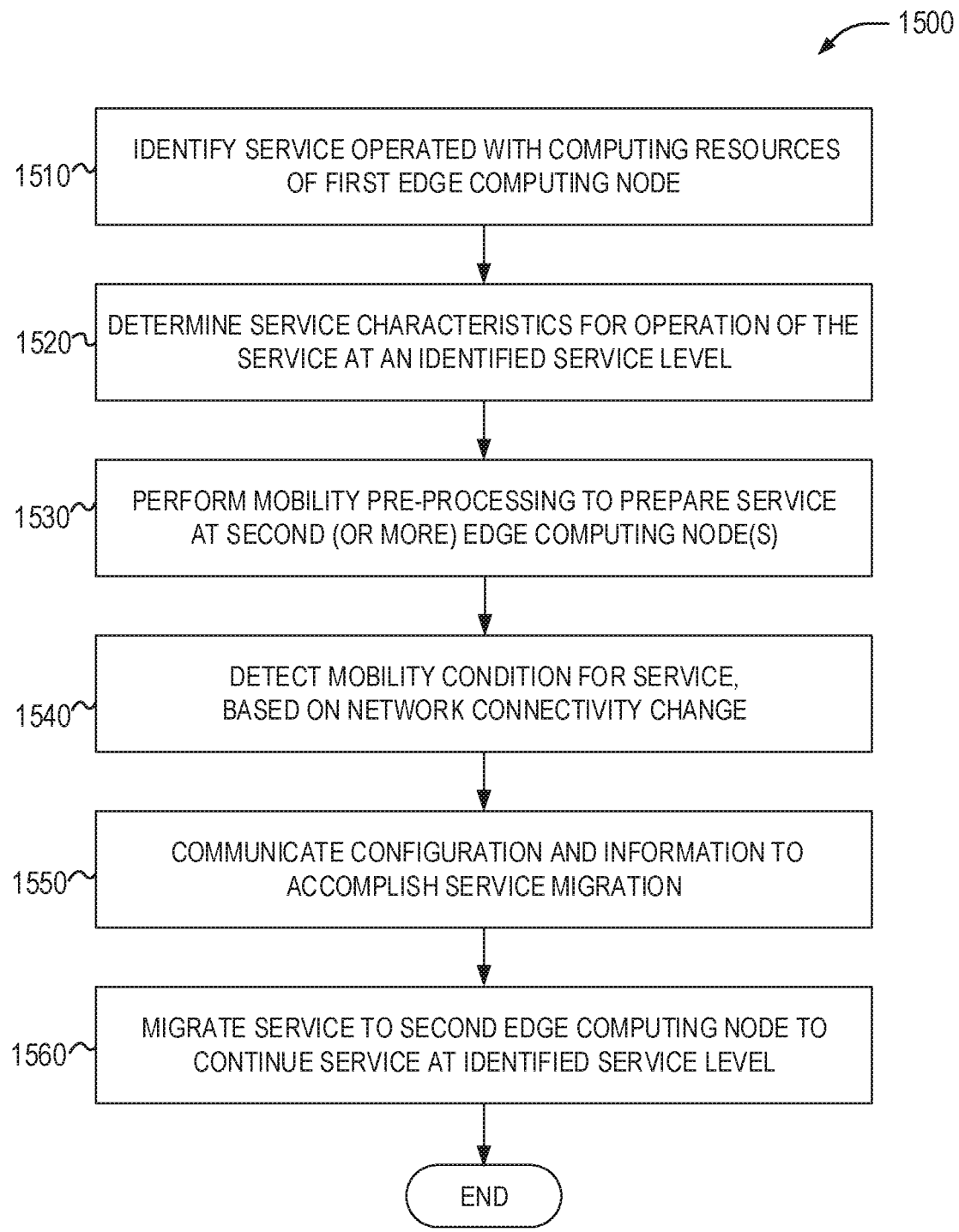
FIG. 15 illustrates a flowchart of a method for implementing QoS and resource management in an edge computing environment, according to an example.

FIG. 15 illustrates a flowchart 1500 of a method of implementing QoS and resource management in an edge computing environment. It will be understood that the following operations are depicted from the perspective of an individual computing system involved in the execution or coordination of resources and services, such as embodied by respective edge computing nodes and network equipment as discussed with the examples above; however, corresponding operations may be performed by endpoint communication devices, intermediate devices, or other entities and services in an implementing system.

The method commences at 1510 with operations at 1510 to identify a service operated with computing resources of a first edge computing node. This service is operated to provide computing capabilities for a connected edge device with (or at) an identified service level. Accordingly, operations at 1520 are performed to determine the service characteristics for this operation of the service at the identified service level.

The method continues at 1530 with operations to perform mobility pre-processing, to prepare a service at a second (or third, fourth, etc.) edge computing node, in connection with a migration condition. In an example this pre-processing includes proactively reserving resources for the service at a second edge computing node, prior to migration of the service, such that the resources are reserved to enable migration of the service with uninterrupted use of the reserved resources at the second edge computing device. In a further example, operations to proactively reserve resources includes: identifying usage of the service and the resources used for the service at the edge computing node; receiving location updates from the connected edge device; predicting locations of the connected edge device and predict usage of the service by the connected edge device at the predicted locations, based on the location updates and the identified usage; and communicate, to the second edge computing node, the predicted locations and usage of the connected edge device, so that the predicted locations and the predicted usage of the service may be used to reserve the resources at the second edge computing apparatus prior to the migration of the service. In this use case, the service may be one of a plurality of services that are identified and migrated to the second edge computing node by proactively reserving the resources, as the various plurality of services are associated with a respective plurality of service levels including the identified service level, and as the services are initiated at differing times based on the respective plurality of service levels.

In another pre-processing example (which may be combined with the other pre-processing examples discussed above), resources for the service are allocated at the second edge computing node, based on a deadline associated with resource usage of the service. In this scenario, the resources are pre-allocated to enable migration of the service with uninterrupted use at the second edge computing node, to enable the migration of the service based on the deadline. Such pre-allocation may also include: identifying usage of the service and the resources allocated for the service at the edge computing node; identifying the deadline and constraints involved in the operation of the service, based on the usage of the service and the resources allocated for the service at the edge computing node, and based on various mobility conditions; and communicating, to the second edge computing node, data indicating the deadline and constraints, as the data indicating the deadline and constraints is used to reserve resources at the second edge computing node prior to the migration of the service. For instance, such constraints may involve a priority of execution operations for the service, as the identified usage of the service and the resources used for the service is based at least in part on predicted usage of the service by the connected edge device.

In another pre-processing example (which may be combined with the other pre-processing examples discussed above), speculative allocation of resources is performed using a plurality of edge computing nodes, such as a second edge computing node located along a first mobility path and a third edge computing located along a second mobility path. Such speculative execution may include identifying multiple potential mobility location paths and potential computing nodes for use of the service by the connected edge device, the mobility location paths including the first and second mobility path, for potential computing nodes including the second and third edge computing nodes; forecasting future resource needs for execution of the service; forecasting a probability and estimated time of usage of the service at the potential computing nodes, according to the forecasted future resource needs; and communicating service pre-allocation information among the potential computing nodes in the potential mobility location paths. In this scenario, the service pre-allocation information is used for the speculative allocation of resources along respective nodes in the potential mobility location paths, as the migration of the service to the second edge computing node occurs based on movement of the connected edge device to the first mobility path. Further operations may be performed, after the migration, to perform a cleanup of resources along one or more unselected paths, including operations to communicate service deallocation information to the third edge computing apparatus.

The method of the flowchart 1500 continues with the detection of the mobility condition for the service at 1540, such as caused from a network connectivity change (e.g., leaving a service coverage area), and any additional operations to communicate service configuration, service information, and the like to accomplish a service migration, at 1550. The flowchart concludes with the actual migration of the service at 1560, to the second edge computing node, to continue service at the identified or relevant service level (e.g., as established or set up with the pre-processing techniques discussed at 1530). In a specific example, the migration of the service may occur automatically, according to a quality of service (QoS) criteria, using a QoS criteria that is determined from the resources and capabilities required for service operation at the edge computing nodes. The coordination of automatic migration may involve identifying the resources and the capabilities required for the service operation, identify a platform configuration for the service used at the edge computing node, to accomplish the resources and the capabilities required for the service operation, and communicating the platform configuration to the second edge computing node, as the platform configuration is adapted for use with the second edge computing node. With this coordination, the service may be operated with the adapted platform configuration to achieve the relevant QoS criteria.

As suggested in the examples above, security characteristics and properties may be part of the hosting environment characteristics and considered when migration or re-allocation occurs. However, in some migration scenarios, the security characteristics must be proven to be correct and in force at the time the resource is migrated to the new destination, so that the new destination security characteristics may be verified as equivalent to the source environment characteristics. It will be understood that additional security functions, verifications, and operations may consider these and similar security characteristics and properties.

As a consequence of the various embodiments discussed herein, a variety of resource and service management operations may be implemented in mobility scenarios. It will be understood that resource and QoS management for services, scenarios, and computing operations involving fixed or stationary computing systems may be adapted using the techniques discussed herein.

FIG. 16 illustrates a MEC and FOG network topology, according to an example. This network topology, which includes a number of conventional networking layers, may be extended through use of the tags and objects discussed herein. Specifically, the relationships between endpoints (at endpoints/things network layer 1650), gateways (at gateway layer 1640), access or edge computing nodes (e.g., at neighborhood nodes layer 1630), core network or routers (e.g., at regional or central office layer 1620), may be represented through the use of linked objects and tag properties.

A FOG network (e.g., established at gateway layer 1640) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 16 illustrates a general architecture that integrates a number of MEC and FOG nodes-categorized in different layers (based on their position, connectivity and processing capabilities, etc.). It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a mobile edge (ME) Host, or a simple entity hosting a ME app and a light-weighted ME Platform. In an example, a MEC or FOG node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional V2V applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in a vehicular communications context, a hierarchical structure of data processing and storage nodes are defined. For example, including local ultra-low-latency processing, regional storage and processing as well as remote cloud data-center based storage and processing. SLAs (service level agreements) and KPIs (key performance indicators) may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

FIG. 17 illustrates processing and storage layers in a MEC and FOG network, according to an example. The illustrated data storage or processing hierarchy 1710 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

FIG. 18 depicts a block diagram for an example MEC system architecture in which any one or more of the techniques (e.g., operations, processes, methods, and methodologies) discussed herein may be performed. In an example, the MEC system architecture may be defined according to a specification, standard, or other definition (e.g., according to the ETSI GS MEC 003 specification). In this diagram, Mp reference points refer to MEC platform functionality; Mm reference points refer to management; and Mx refers to connections to external entities. The services, applications, orchestrators, and other entities discussed herein (e.g., in FIGS. 3 to 15) may be implemented at any number of the entities of the MEC system architecture depicted in FIG. 18, and the communications to perform network operations may be implemented at any number of the interfaces of the MEC system architecture depicted in FIG. 18.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel.

10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.1 1p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 19:
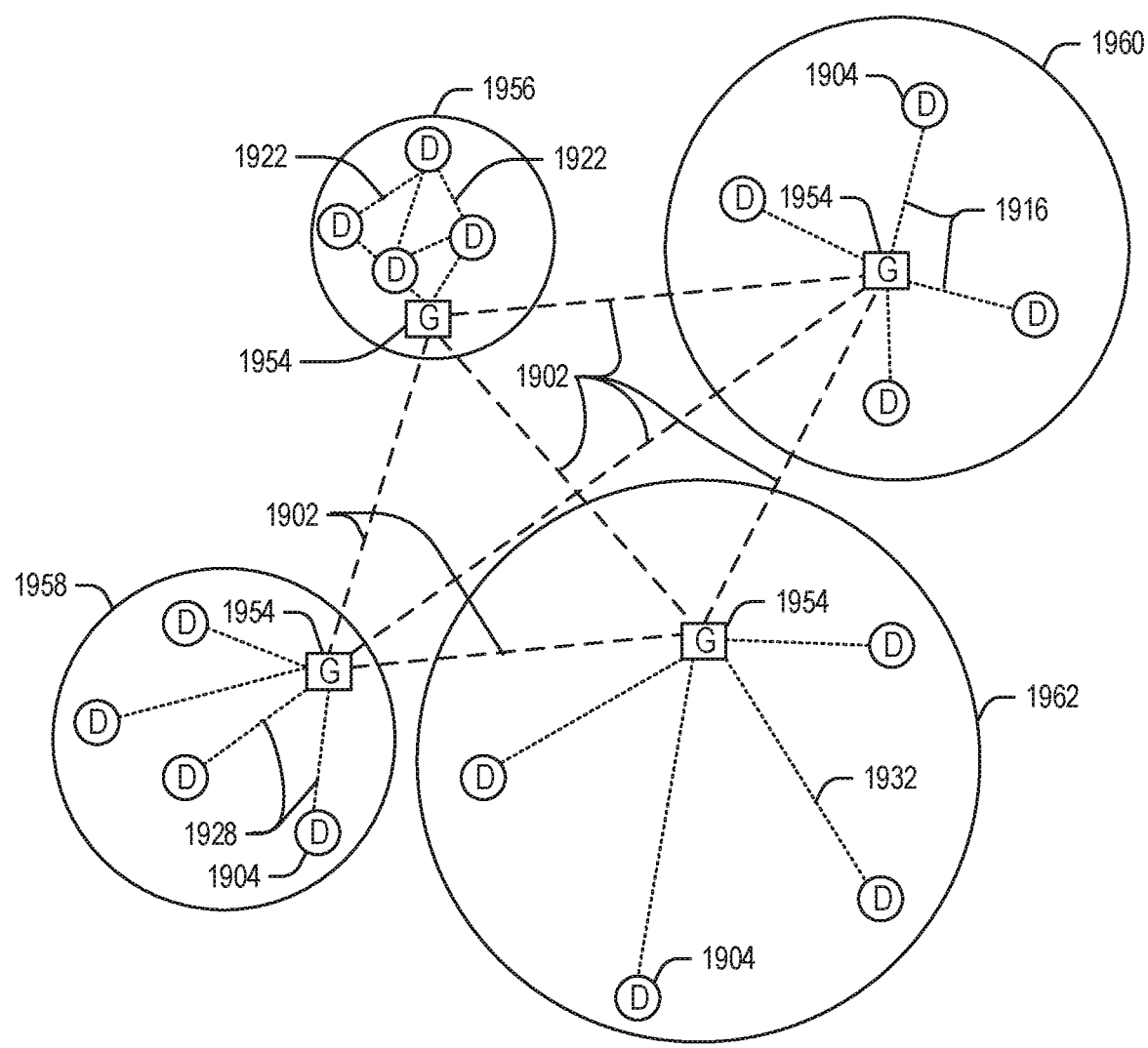
FIG. 19 illustrates a domain topology for respective device networks (e.g., internet-of-things (IoT) device networks) coupled through links to respective gateways, according to an example.

In further examples, the preceding examples of network communications and operations may be integrated with IoT and like endpoint device-based network architectures. FIG. 19 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

MEC use cases have been envisioned to integrate into a number of network and application settings, including those to support network arrangements of IoT deployments. IoT devices are physical or virtualized objects that may communicate on a network (typically at the edge or endpoint of a network), and may include sensors, actuators, and other input/output components, such as to collect data or perform actions from a real world environment. For example, IoT devices may include low-powered devices that are embedded or attached to everyday things, such as buildings, vehicles, packages, etc., to provide sensor, data, or processing functionality. Recently, IoT devices have become more popular and thus applications and use cases using these devices have proliferated.

Various standards have been proposed to more effectively interconnect and operate IoT devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks present a number of new challenges in a heterogeneous network of connectivity comprising a combination of wired and wireless technologies.

FIG. 19 specifically provides a simplified drawing of a domain topology that may be used for a number of IoT networks comprising IoT devices 1904, with the IoT networks 1956, 1958, 1960, 1962, coupled through backbone links 1902 to respective gateways 1954. For example, a number of IoT devices 1904 may communicate with a gateway 1954, and with each other through the gateway 1954. To simplify the drawing, not every IoT device 1904, or communications link (e.g., link 1916, 1922, 1928, or 1932) is labeled. The backbone links 1902 may include any number of wired or wireless technologies, including optical networks, and may be part of a local area network (LAN), a wide area network (WAN), or the Internet. Additionally, such communication links facilitate optical signal paths among both IoT devices 1904 and gateways 1954, including the use of MUXing/deMUXing components that facilitate interconnection of the various devices.

The network topology may include any number of types of IoT networks, such as a mesh network provided with the network 1956 using Bluetooth low energy (BLE) links 1922. Other types of IoT networks that may be present include a wireless local area network (WLAN) network 1958 used to communicate with IoT devices 1904 through IEEE 802.11 (Wi-Fi®) links 1928, a cellular network 1960 used to communicate with IoT devices 1904 through an LTE/LTE-A (4G) or 5G cellular network, and a low-power wide area (LPWA) network 1962, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1904, such as over the backbone links 1902, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1956, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1958, for instance, may use systems that perform standards conversion to provide multi-standard connectivity, enabling IoT devices 1904 using different protocols to communicate. Further systems may provide seamless interconnectivity across a multi-standard infrastructure comprising visible Internet resources and hidden Internet resources.

Communications in the cellular network 1960, for instance, may be enhanced by systems that offload data, extend communications to more remote devices, or both. The LPWA network 1962 may include systems that perform non-Internet protocol (IP) to IP interconnections, addressing, and routing. Further, each of the IoT devices 1904 may include the appropriate transceiver for wide area communications with that device. Further, each IoT device 1904 may include other transceivers for communications using additional protocols and frequencies. This is discussed further with respect to the communication environment and hardware of an IoT processing device depicted in FIGS. 19 and 20.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 18 below.

FIG. 18 illustrates a cloud computing network in communication with a mesh network of IoT devices (devices 1802) operating as a fog platform in a networked scenario. The mesh network of IoT devices may be termed a fog network 1820, established from a network of devices operating at the edge of the cloud 1800. To simplify the diagram, not every IoT device 1802 is labeled.

The fog network 1820 may be considered to be a massively interconnected network wherein a number of IoT devices 1802 are in communications with each other, for example, by radio links 1822. The fog network 1820 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1820 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1802 are shown in this example, gateways 1804, data aggregators 1826, and sensors 1828, although any combinations of IoT devices 1802 and functionality may be used. The gateways 1804 may be edge devices that provide communications between the cloud 1800 and the fog 1820, and may also provide the backend process function for data obtained from sensors 1828, such as motion data, flow data, temperature data, and the like. The data aggregators 1826 may collect data from any number of the sensors 1828, and perform the back end processing function for the analysis. The results, raw data, or both may be passed along to the cloud 1800 through the gateways 1804. The sensors 1828 may be full IoT devices 1802, for example, capable of both collecting data and processing the data. In some cases, the sensors 1828 may be more limited in functionality, for example, collecting the data and enabling the data aggregators 1826 or gateways 1804 to process the data.

Communications from any IoT device 1802 may be passed along a convenient path (e.g., a most convenient path) between any of the IoT devices 1802 to reach the gateways 1804. In these networks, the number of interconnections provide substantial redundancy, enabling communications to be maintained, even with the loss of a number of IoT devices 1802. Further, the use of a mesh network may enable IoT devices 1802 that are very low power or located at a distance from infrastructure to be used, as the range to connect to another IoT device 1802 may be much less than the range to connect to the gateways 1804.

The fog 1820 provided from these IoT devices 1802 may be presented to devices in the cloud 1800, such as a server 1806, as a single device located at the edge of the cloud 1800, e.g., a fog device. In this example, the alerts coming from the fog device may be sent without being identified as coming from a specific IoT device 1802 within the fog 1820.

In this fashion, the fog 1820 may be considered a distributed platform that provides computing and storage resources to perform processing or data-intensive tasks such as data analytics, data aggregation, and machine-learning, among others.

In some examples, the IoT devices 1802 may be configured using an imperative programming style, e.g., with each IoT device 1802 having a specific function and communication partners. However, the IoT devices 1802 forming the fog device may be configured in a declarative programming style, enabling the IoT devices 1802 to reconfigure their operations and communications, such as to determine needed resources in response to conditions, queries, and device failures. As an example, a query from a user located at a server 1806 about the operations of a subset of equipment monitored by the IoT devices 1802 may result in the fog 1820 device selecting the IoT devices 1802, such as particular sensors 1828, needed to answer the query. The data from these sensors 1828 may then be aggregated and analyzed by any combination of the sensors 1828, data aggregators 1826, or gateways 1804, before being sent on by the fog 1820 device to the server 1806 to answer the query. In this example, IoT devices 1802 in the fog 1820 may select the sensors 1828 used based on the query, such as adding data from flow sensors or temperature sensors. Further, if some of the IoT devices 1802 are not operational, then other IoT devices 1802 in the fog 1820 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

FIG. 19 illustrates a drawing of a cloud computing network, or cloud 1900, in communication with a number of IoT devices. The cloud 1900 may represent the Internet, or may be a local area network (LAN), or a wide area network (WAN), such as a proprietary network for a company. The IoT devices may include any number of different types of devices, grouped in various combinations. For example, a traffic control group 1906 may include IoT devices along streets in a city. These IoT devices may include stoplights, traffic flow monitors, cameras, weather sensors, and the like. The traffic control group 1906, or other subgroups, may be in communication with the cloud 1900 through wired or wireless links 1908, such as LPWA links, optical links, and the like. Further, a wired or wireless sub-network 1912 may allow the IoT devices to communicate with each other, such as through a local area network, a wireless local area network, and the like. The IoT devices may use another device, such as a gateway 1910 or 1928 to communicate with remote locations such as the cloud 1900; the IoT devices may also use one or more servers 1930 to facilitate communication with the cloud 1900 or with the gateway 1910. For example, the one or more servers 1930 may operate as an intermediate network node to support a local edge cloud or fog implementation among a local area network. Further, the gateway 1928 that is depicted may operate in a cloud-to-gateway-to-many edge devices configuration, such as with the various IoT devices 1914, 1920, 1924 being constrained or dynamic to an assignment and use of resources in the cloud 1900.

Other example groups of IoT devices may include remote weather stations 1914, local information terminals 1916, alarm systems 1918, automated teller machines 1920, alarm panels 1922, or moving vehicles, such as emergency vehicles 1924 or other vehicles 1926, among many others. Each of these IoT devices may be in communication with other IoT devices, with servers 1904, with another IoT fog platform or system, or a combination therein. The groups of IoT devices may be deployed in various residential, commercial, and industrial settings (including in private or public environments).

As may be seen from FIG. 19, a large number of IoT devices may be communicating through the cloud 1900. This may allow different IoT devices to request or provide information to other devices autonomously. For example, a group of IoT devices (e.g., the traffic control group 1906) may request a current weather forecast from a group of remote weather stations 1914, which may provide the forecast without human intervention. Further, an emergency vehicle 1924 may be alerted by an automated teller machine 1920 that a burglary is in progress. As the emergency vehicle 1924 proceeds towards the automated teller machine 1920, it may access the traffic control group 1906 to request clearance to the location, for example, by lights turning red to block cross traffic at an intersection in sufficient time for the emergency vehicle 1924 to have unimpeded access to the intersection.

Clusters of IoT devices, such as the remote weather stations 1914 or the traffic control group 1906, may be equipped to communicate with other IoT devices as well as with the cloud 1900. This may allow the IoT devices to form an ad-hoc network between the devices, allowing them to function as a single device, which may be termed a fog platform or system (e.g., as described above with reference to FIG. 18).

Figure 20:
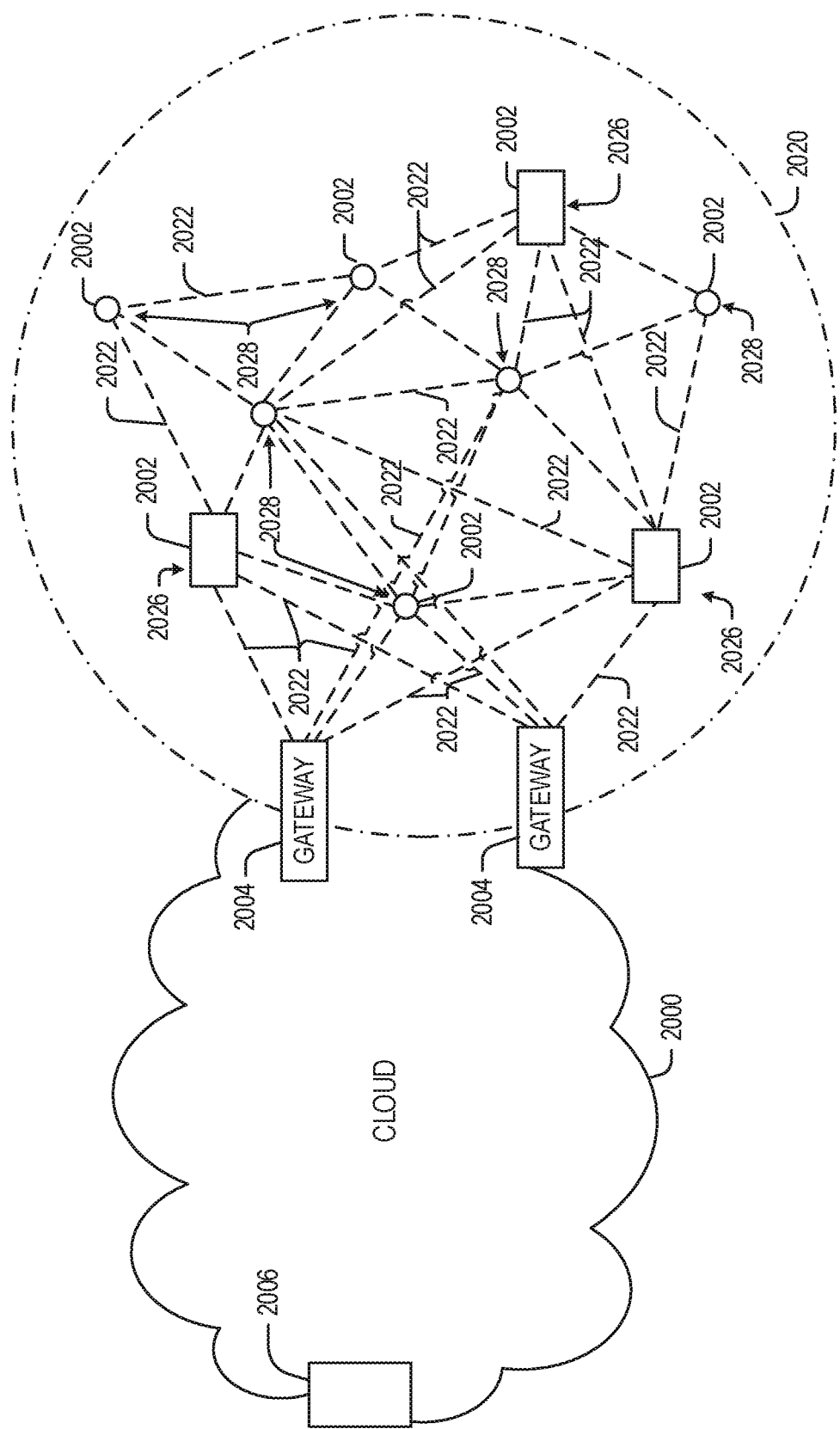
FIG. 20 illustrates a cloud-computing network in communication with a mesh network of IoT/endpoint devices operating as a fog device at the edge of the cloud-computing network, according to an example.
Figure 21:
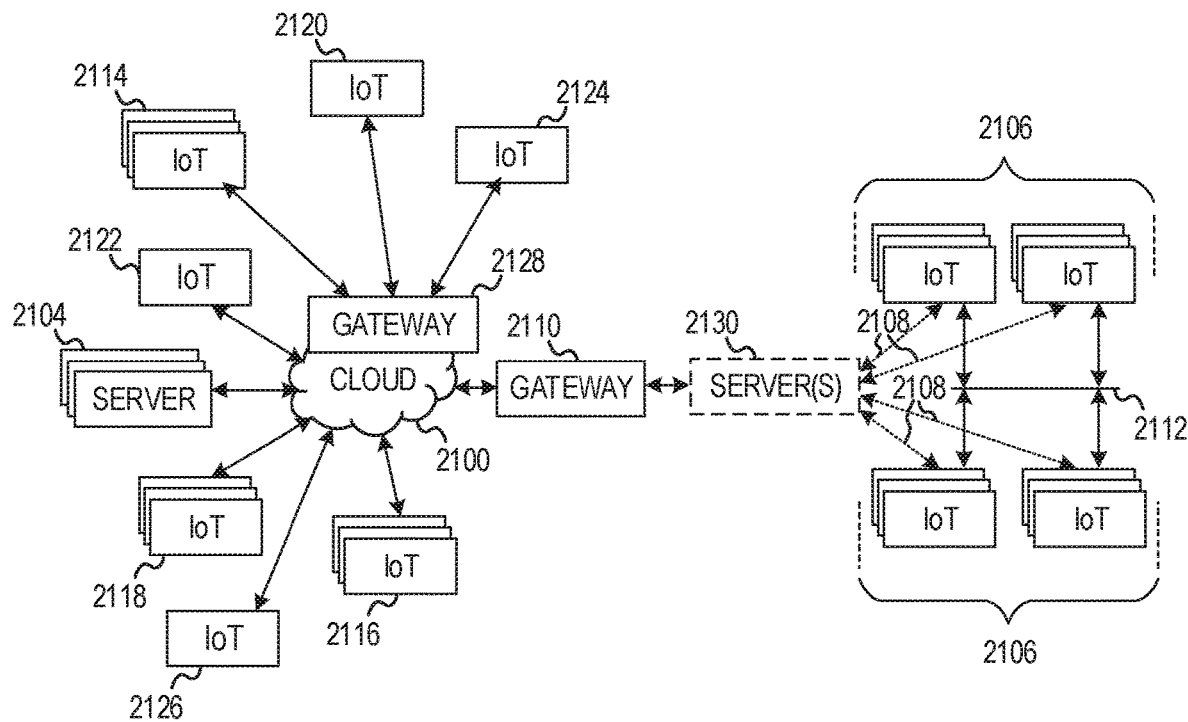
FIG. 21 illustrates a block diagram of a network illustrating communications among a number of IoT/endpoint devices, according to an example.
Figure 22:
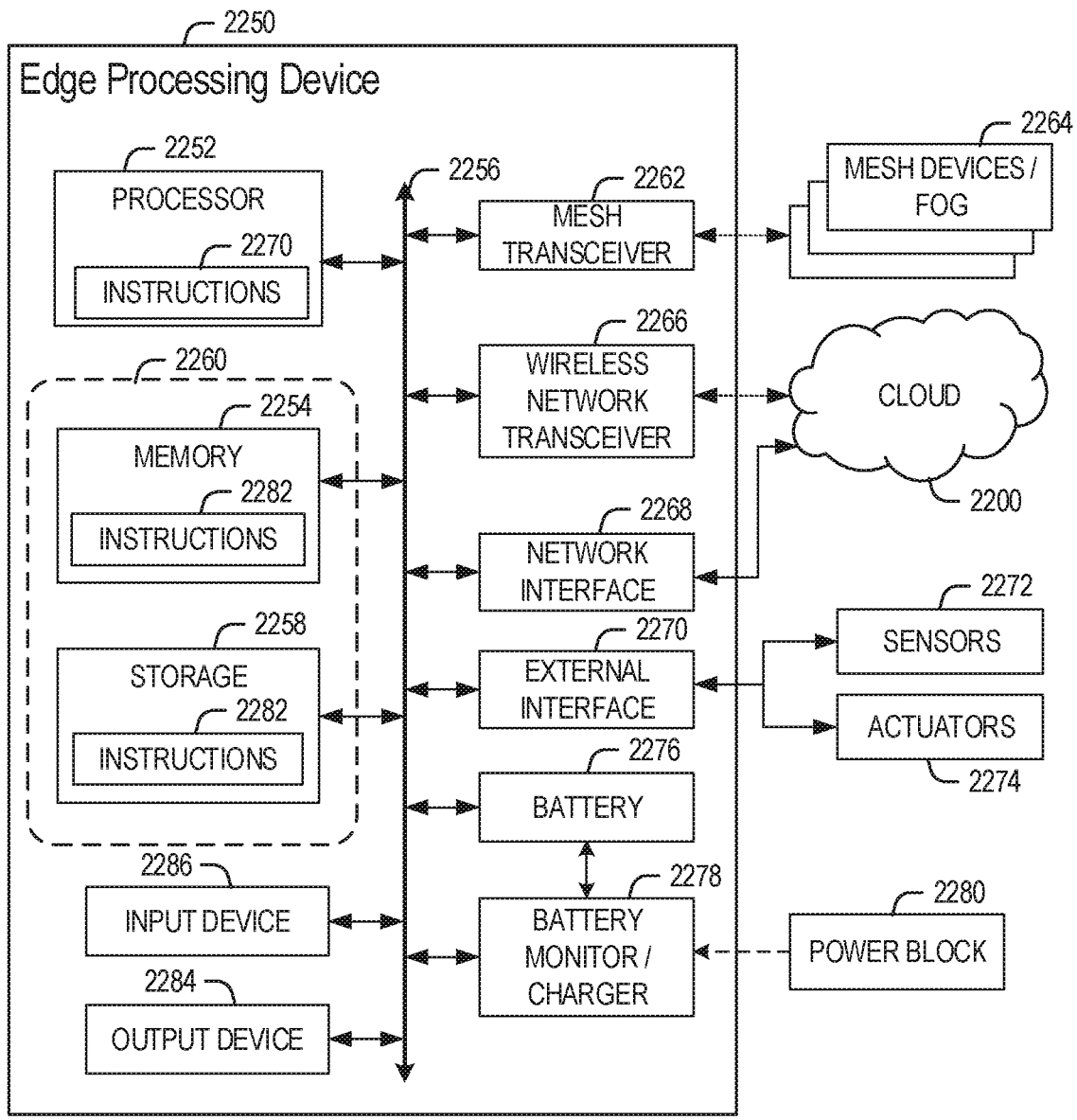
FIG. 22 illustrates a block diagram for an example device architecture upon which any one or more of the techniques (e.g., operations, processes, methods, and methodologies) discussed herein may be performed, according to an example.

FIG. 20 is a block diagram of an example of components that may be present in an IoT device 2050 for implementing the techniques described herein. The IoT device 2050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 2050, or as components otherwise incorporated within a chassis of a larger system. Additionally, the block diagram of FIG. 20 is intended to depict a high-level view of components of the IoT device 2050. However, some of the components shown may be omitted, additional components may be present, and different arrangement of the components shown may occur in other implementations.

The IoT device 2050 may include processing circuitry in the form of a processor 2052, which may be a microprocessor, a multi-core processor, a multithreaded processor, an ultra-low voltage processor, an embedded processor, or other known processing elements. The processor 2052 may be a part of a system on a chip (SoC) in which the processor 2052 and other components are formed into a single integrated circuit, or a single package, such as the Edison™ or Galileo™ SoC boards from Intel. As an example, the processor 2052 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 2052 may communicate with a system memory 2054 over an interconnect 2056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2058 may also couple to the processor 2052 via the interconnect 2056. In an example the storage 2058 may be implemented via a solid state disk drive (SSDD). Other devices that may be used for the storage 2058 include flash memory cards, such as SD cards, microSD cards, xD picture cards, and the like, and USB flash drives. In low power implementations, the storage 2058 may be on-die memory or registers associated with the processor 2052. However, in some examples, the storage 2058 may be implemented using a micro hard disk drive (HDD). Further, any number of new technologies may be used for the storage 2058 in addition to, or instead of, the technologies described, such resistance change memories, phase change memories, holographic memories, or chemical memories, among others.

The components may communicate over the interconnect 2056. The interconnect 2056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2056 may be a proprietary bus, for example, used in a SoC based system. Other bus systems may be included, such as an I2C interface, an SPI interface, point to point interfaces, and a power bus, among others.

The interconnect 2056 may couple the processor 2052 to a mesh transceiver 2062, for communications with other mesh devices 2064. The mesh transceiver 2062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2062 may communicate using multiple standards or radios for communications at different range. For example, the IoT device 2050 may communicate with close devices, e.g., within about 10 meters, using a local transceiver based on BLE, or another low power radio, to save power. More distant mesh devices 2064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2066 may be included to communicate with devices or services in the cloud 2000 via local or wide area network protocols. The wireless network transceiver 2066 may be a LPWA transceiver that follows the IEEE 802.15.4, or IEEE 802.15.4g standards, among others. The IoT device 2050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2062 and wireless network transceiver 2066, as described herein. For example, the radio transceivers 2062 and 2066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2062 and 2066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System)

communication technology, In addition to the standards listed above, any number of satellite uplink technologies may be used for the wireless network transceiver 2066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2068 may be included to provide a wired communication to the cloud 2000 or to other devices, such as the mesh devices 2064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2068 may be included to enable connect to a second network, for example, a NIC 2068 providing communications to the cloud over Ethernet, and a second NIC 2068 providing communications to other devices over another type of network.

Given the variety of types of applicable communications from the device to another component or network, applicable communications circuitry used by the device may include or be embodied by any one or more of components 2062, 2066, 2068, or 2070. Accordingly, in various examples, applicable means for communicating (e.g., receiving, transmitting, etc.) may be embodied by such communications circuitry.

The interconnect 2056 may couple the processor 2052 to an external interface 2070 that is used to connect external devices or subsystems. The external devices may include sensors 2072, such as accelerometers, level sensors, flow sensors, optical light sensors, camera sensors, temperature sensors, global positioning system (GPS) sensors, pressure sensors, barometric pressure sensors, and the like. The external interface 2070 further may be used to connect the IoT device 2050 to actuators 2074, such as power switches, valve actuators, an audible sound generator, a visual warning device, and the like.

In some optional examples, various input/output (I/O) devices may be present within, or connected to, the IoT device 2050. For example, a display or other output device 2084 may be included to show information, such as sensor readings or actuator position. An input device 2086, such as a touch screen or keypad may be included to accept input. An output device 2084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 2050.

A battery 2076 may power the IoT device 2050, although in examples in which the IoT device 2050 is mounted in a fixed location, it may have a power supply coupled to an electrical grid. The battery 2076 may be a lithium ion battery, or a metal-air battery, such as a zinc-air battery, an aluminum-air battery, a lithium-air battery, and the like.

A battery monitor/charger 2078 may be included in the IoT device 2050 to track the state of charge (SoCh) of the battery 2076. The battery monitor/charger 2078 may be used to monitor other parameters of the battery 2076 to provide failure predictions, such as the state of health (SoH) and the state of function (SoF) of the battery 2076. The battery monitor/charger 2078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2078 may communicate the information on the battery 2076 to the processor 2052 over the interconnect 2056. The battery monitor/charger 2078 may also include an analog-to-digital (ADC) convertor that enables the processor 2052 to directly monitor the voltage of the battery 2076 or the current flow from the battery 2076. The battery parameters may be used to determine actions that the IoT device 2050 may perform, such as transmission frequency, mesh network operation, sensing frequency, and the like.

A power block 2080, or other power supply coupled to a grid, may be coupled with the battery monitor/charger 2078 to charge the battery 2076. In some examples, the power block 2080 may be replaced with a wireless power receiver to obtain the power wirelessly, for example, through a loop antenna in the IoT device 2050. A wireless battery charging circuit, such as an LTC4020 chip from Linear Technologies of Milpitas, California, among others, may be included in the battery monitor/charger 2078. The specific charging circuits chosen depend on the size of the battery 2076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2058 may include instructions 2082 in the form of software, firmware, or hardware commands to implement the techniques described herein. Although such instructions 2082 are shown as code blocks included in the memory 2054 and the storage 2058, it may be understood that any of the code blocks may be replaced with hardwired circuits, for example, built into an application specific integrated circuit (ASIC).

In an example, the instructions 2082 provided via the memory 2054, the storage 2058, or the processor 2052 may be embodied as a non-transitory, machine readable medium 2060 including code to direct the processor 2052 to perform electronic operations in the IoT device 2050. The processor 2052 may access the non-transitory, machine readable medium 2060 over the interconnect 2056. For instance, the non-transitory, machine readable medium 2060 may be embodied by devices described for the storage 2058 or may include specific storage units such as optical disks, flash drives, or any number of other hardware devices. The non-transitory, machine-readable medium 2060 may include instructions to direct the processor 2052 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an edge computing apparatus, comprising: processing circuitry; and a memory device including instructions embodied thereon, wherein the instructions, which when executed by the processing circuitry, configure the processing circuitry to perform operations to: identify a service operated with computing resources of the edge computing apparatus, the service providing computing capabilities for a connected edge device with an identified service level; identify a mobility condition for the service, based on a change in network connectivity from the edge computing apparatus to the connected edge device; and perform a migration of the service to a second edge computing apparatus, based on the identified mobility condition, wherein the service is continued at the second edge computing apparatus to provide computing capabilities for the connected edge device with the identified service level.

In Example 2, the subject matter of Example 1 includes, the instructions further to perform operations to: proactively reserve resources for the service at the second edge computing apparatus, prior to migration of the service, wherein the resources are reserved to enable migration of the service with uninterrupted use of the reserved resources at the second edge computing device.

In Example 3, the subject matter of Example 2 includes, subject matter where the operations to proactively reserve resources include operations to: identify usage of the service and the resources used for the service at the edge computing apparatus; receive location updates from the connected edge device; predict locations of the connected edge device and predict usage of the service by the connected edge device at the predicted locations, based on the location updates and the identified usage; and communicate, to the second edge computing apparatus, the predicted locations and usage of the connected edge device, wherein the predicted locations and the predicted usage of the service are used to reserve the resources at the second edge computing apparatus prior to the migration of the service.

In Example 4, the subject matter of Example 3 includes, subject matter where the service is one of a plurality of services that are identified and migrated to the second edge computing apparatus by proactively reserving the resources, wherein the plurality of services are associated with a respective plurality of service levels including the identified service level, and wherein the services are initiated at differing times based on the respective plurality of service levels.

In Example 5, the subject matter of Examples 1-4 includes, the instructions further to perform operations to: allocate resources for the service at the second edge computing apparatus, based on a deadline associated with resource usage of the service, wherein the resources are pre-allocated to enable migration of the service with uninterrupted use at the second edge computing apparatus, and wherein the migration of the service occurs based on the deadline.

In Example 6, the subject matter of Example 5 includes, subject matter where the operations to allocate resources based on the deadline include operations to: identify usage of the service and the resources allocated for the service at the edge computing apparatus; identify the deadline and constraints involved in the operation of the service, based on the usage of the service and the resources allocated for the service at the edge computing apparatus, and based on the mobility condition; and communicate, to the second edge computing apparatus, data indicating the deadline and constraints, wherein the data indicating the deadline and constraints is used to reserve resources at the second edge computing apparatus prior to the migration of the service.

In Example 7, the subject matter of Example 6 includes, subject matter where the constraints involved in the operation of the service involves a priority of execution operations for the service, and wherein the identified usage of the service and the resources used for the service is based at least in part on predicted usage of the service by the connected edge device.

In Example 8, the subject matter of Examples 1-7 includes, the instructions further to perform operations to: perform speculative allocation of resources among a plurality of edge computing apparatuses including the second edge computing apparatus and a third edge computing apparatus, wherein the second edge computing apparatus is located along a first mobility path and the third edge computing apparatus is located along a second mobility path.

In Example 9, the subject matter of Example 8 includes, subject matter where the operations to perform the speculative allocation of resources include operations to: identify multiple potential mobility location paths and potential computing nodes for use of the service by the connected edge device, the mobility location paths including the first and second mobility path, wherein the potential computing nodes include the second and third edge computing apparatuses; forecast future resource needs for execution of the service; forecast a probability and estimated time of usage of the service at the potential computing nodes, according to the forecasted future resource needs; and communicate service pre-allocation information among the potential computing nodes in the potential mobility location paths; wherein the service pre-allocation information is used for the speculative allocation of resources along respective nodes in the potential mobility location paths; and wherein the migration of the service to the second edge computing apparatus occurs based on movement of the connected edge device to the first mobility path.

In Example 10, the subject matter of Example 9 includes, subject matter where the operations to perform the speculative allocation of resources further include operations to: perform a cleanup of resources of the potential computing nodes along one or more unselected paths, including operations to communicate service deallocation information to the third edge computing apparatus.

In Example 11, the subject matter of Examples 1-10 includes, the instructions further to perform operations to: initiate the migration of the service automatically, according to a quality of service (QoS) criteria, wherein the QoS criteria is determined from the resources and capabilities required for service operation at the edge computing apparatus and at the second edge computing apparatus.

In Example 12, the subject matter of Example 11 includes, subject matter where the operations to initiate the migration of the service automatically include operations to: identify the resources and the capabilities required for the service operation; identify a platform configuration for the service used at the edge computing apparatus, to accomplish the resources and the capabilities required for the service operation; and communicate the platform configuration from the edge computing apparatus to the second edge computing apparatus, wherein the platform configuration is adapted for use with the second edge computing apparatus; wherein the service is operated with the adapted platform configuration to achieve the QoS criteria for the service.

Example 13 is a method, performed by an edge computing apparatus operated in a mobility network, comprising: evaluating data for a service operated with computing resources of the edge computing apparatus, the service providing computing capabilities for a connected edge device with an identified service level; detecting a mobility condition for the service, based on a change in network connectivity from the edge computing apparatus to the connected edge device; and performing a migration of the service to a second edge computing apparatus, based on the detected mobility condition, wherein the service is continued at the second edge computing apparatus to provide computing capabilities for the connected edge device with the identified service level.

In Example 14, the subject matter of Example 13 includes, proactively reserving resources for the service at the second edge computing apparatus, prior to migration of the service, wherein the resources are reserved to enable migration of the service with uninterrupted use of the reserved resources at the second edge computing device.

In Example 15, the subject matter of Example 14 includes, subject matter where proactively reserving resources comprises: identifying usage of the service and the resources used for the service at the edge computing apparatus; receiving location updates from the connected edge device; predicting locations of the connected edge device and predict usage of the service by the connected edge device at the predicted locations, based on the location updates and the identified usage; and communicating, to the second edge computing apparatus, the predicted locations and usage of the connected edge device, wherein the predicted locations and the predicted usage of the service are used to reserve the resources at the second edge computing apparatus prior to the migration of the service.

In Example 16, the subject matter of Example 15 includes, subject matter where the service is one of a plurality of services that are identified and migrated to the second edge computing apparatus by proactively reserving the resources, wherein the plurality of services are associated with a respective plurality of service levels including the identified service level, and wherein the services are initiated at differing times based on the respective plurality of service levels.

In Example 17, the subject matter of Examples 13-16 includes, allocating resources for the service at the second edge computing apparatus, based on a deadline associated with resource usage of the service, wherein the resources are pre-allocated to enable migration of the service with uninterrupted use at the second edge computing apparatus, and wherein the migration of the service occurs based on the deadline.

In Example 18, the subject matter of Example 17 includes, subject matter where allocating resources based on the deadline comprises: identifying usage of the service and the resources allocated for the service at the edge computing apparatus; identifying the deadline and constraints involved in operation of the service, based on the usage of the service and the resources allocated for the service at the edge computing apparatus, and based on the mobility condition; and communicating, to the second edge computing apparatus, data indicating the deadline and constraints, wherein the data indicating the deadline and constraints is used to reserve resources at the second edge computing apparatus prior to the migration of the service.

In Example 19, the subject matter of Example 18 includes, subject matter where the constraints involved in operation of the service involves a priority of execution operations for the service, and wherein the identified usage of the service and the resources used for the service is based at least in part on predicted usage of the service by the connected edge device.

In Example 20, the subject matter of Examples 13-19 includes, performing speculative allocation of resources among a plurality of edge computing apparatuses including the second edge computing apparatus and a third edge computing apparatus, wherein the second edge computing apparatus is located along a first mobility path and the third edge computing apparatus is located along a second mobility path.

In Example 21, the subject matter of Example 20 includes, subject matter where performing the speculative allocation of resources further comprises: identifying multiple potential mobility location paths and potential computing nodes for use of the service by the connected edge device, the mobility location paths including the first and second mobility path, wherein the potential computing nodes include the second and third edge computing apparatuses; forecasting future resource needs for execution of the service; forecasting a probability and estimated time of usage of the service at the potential computing nodes, according to the forecasted future resource needs; and communicating service pre-allocation information among the potential computing nodes in the potential mobility location paths; wherein the service pre-allocation information is used for the speculative allocation of resources along respective nodes in the potential mobility location paths; and wherein the migration of the service to the second edge computing apparatus occurs based on movement of the connected edge device to the first mobility path.

In Example 22, the subject matter of Example 21 includes, subject matter where performing the speculative allocation of resources further comprises: performing a cleanup of resources of the potential computing nodes along one or more unselected paths, including operations to communicate service deallocation information to the third edge computing apparatus.

In Example 23, the subject matter of Examples 13-22 includes, initiating the migration of the service automatically, according to a quality of service (QoS) criteria, wherein the QoS criteria is determined from the resources and capabilities required for service operation at the edge computing apparatus and at the second edge computing apparatus.

In Example 24, the subject matter of Example 23 includes, subject matter where initiating the migration of the service automatically further comprises: identifying the resources and the capabilities required for the service operation; identifying a platform configuration for the service used at the edge computing apparatus, to accomplish the resources and the capabilities required for the service operation; and communicating the platform configuration from the edge computing apparatus to the second edge computing apparatus, wherein the platform configuration is adapted for use with the second edge computing apparatus; wherein the service is operated with the adapted platform configuration to achieve the QoS criteria for the service.

Example 25 is a system, comprising: a first edge computing node, the first edge computing node comprising processing circuitry to operate a migration function, the migration function configured to: operate a service with computing resources of the first edge computing node, the service providing computing capabilities for a connected edge device with an identified service level; identify a mobility condition for the service, based on a change in network connectivity from the first edge computing node to the connected edge device; and perform communications to initiate a migration of the service, and to communicate the identified service level for the service; and a second edge computing node, the second edge computing node comprising processing circuitry to operate the migration function, the migration function configured to: initiate a new instance of the service with computing resources of the second edge computing node, the service providing computing capabilities for the connected edge device with the identified service level; and perform communications to receive the migration of the service, wherein the service is continued at the second edge computing apparatus to provide computing capabilities for the connected edge device with the identified service level.

In Example 26, the subject matter of Example 25 includes, subject matter where the first edge computing node and the second edge computing node are operated at respective computing resources at base stations.

In Example 27, the subject matter of Examples 25-26 includes, a third edge computing node operating as an orchestrator, the third edge computing node configured to coordinate the migration of the service between the first and second edge computing nodes and to coordinate the operation of the service on behalf of the connected edge device.

Example 28 is at least one machine-readable storage medium including instructions, wherein the instructions, when executed by a processing circuitry of a computing device, cause the processing circuitry to perform operations of any of Examples 1 to 27.

Example 29 is an apparatus, comprising: means for evaluating data for a service operated with computing resources of an edge computing system, the service providing computing capabilities for a connected edge device with an identified service level; means for detecting a mobility condition for the service, based on a change in network connectivity from the edge computing system to the connected edge device; and means for performing a migration of the service to a second edge computing system, based on the detected mobility condition, wherein the service is continued at the second edge computing system to provide computing capabilities for the connected edge device with the identified service level.

In Example 30, the subject matter of Example 29 includes, means for proactively reserving resources for the service at the second edge computing system, prior to migration of the service, wherein the resources are reserved to enable migration of the service with uninterrupted use of the reserved resources at the second edge computing device.

In Example 31, the subject matter of Example 30 includes, means for identifying usage of the service and the resources used for the service at the edge computing system; means for receiving location updates from the connected edge device; means for predicting locations of the connected edge device and predict usage of the service by the connected edge device at the predicted locations, based on the location updates and the identified usage; and means for communicating, to the second edge computing system, the predicted locations and usage of the connected edge device, wherein the predicted locations and the predicted usage of the service are used to reserve the resources at the second edge computing system prior to the migration of the service.

In Example 32, the subject matter of Example 31 includes, subject matter where the service is one of a plurality of services that are identified and migrated to the second edge computing system by proactively reserving the resources, wherein the plurality of services are associated with a respective plurality of service levels including the identified service level, and wherein the services are initiated at differing times based on the respective plurality of service levels.

In Example 33, the subject matter of Examples 29-32 includes, means for allocating resources for the service at the second edge computing system, based on a deadline associated with resource usage of the service, wherein the resources are pre-allocated to enable migration of the service with uninterrupted use at the second edge computing apparatus, and wherein the migration of the service occurs based on the deadline.

In Example 34, the subject matter of Example 33 includes, means for identifying usage of the service and the resources allocated for the service at the edge computing system; means for identifying the deadline and constraints involved in operation of the service, based on the usage of the service and the resources allocated for the service at the edge computing system, and based on the mobility condition; and means for communicating, to the second edge computing system, data indicating the deadline and constraints, wherein the data indicating the deadline and constraints is used to reserve resources at the second edge computing system prior to the migration of the service.

In Example 35, the subject matter of Example 34 includes, subject matter where the constraints involved in operation of the service involves a priority of execution operations for the service, and wherein the identified usage of the service and the resources used for the service is based at least in part on predicted usage of the service by the connected edge device.

In Example 36, the subject matter of Examples 29-35 includes, means for performing speculative allocation of resources among a plurality of edge computing systems including the second edge computing system and a third edge computing system, wherein the second edge computing system is located along a first mobility path and the third edge computing system is located along a second mobility path.

In Example 37, the subject matter of Example 36 includes, means for identifying multiple potential mobility location paths and potential computing nodes for use of the service by the connected edge device, the mobility location paths including the first and second mobility path, wherein the potential computing nodes include the second and third edge computing systems; means for forecasting future resource needs for execution of the service; means for forecasting a probability and estimated time of usage of the service at the potential computing nodes, according to the forecasted future resource needs; and means for communicating service pre-allocation information among the potential computing nodes in the potential mobility location paths; wherein the service pre-allocation information is used for the speculative allocation of resources along respective nodes in the potential mobility location paths; and wherein the migration of the service to the second edge computing system occurs based on movement of the connected edge device to the first mobility path.

In Example 38, the subject matter of Example 37 includes, means for performing a cleanup of resources of the potential computing nodes along one or more unselected paths, including operations to communicate service deallocation information to the third edge computing system.

In Example 39, the subject matter of Examples 29-38 includes, means for initiating the migration of the service automatically, according to a quality of service (QoS) criteria, wherein the QoS criteria is determined from the resources and capabilities required for service operation at the edge computing system and at the second edge computing system.

In Example 40, the subject matter of Example 39 includes, means for identifying the resources and the capabilities required for the service operation; means for identifying a platform configuration for the service used at the edge computing system, to accomplish the resources and the capabilities required for the service operation; and means for communicating the platform configuration from the edge computing system to the second edge computing system, wherein the platform configuration is adapted for use with the second edge computing system; wherein the service is operated with the adapted platform configuration to achieve the QoS criteria for the service.

Example 41 is an apparatus comprising means to perform one or more elements of a method described in or related to any of Examples 13-24 or 29-40.

Example 42 is at least one machine-readable storage medium, comprising information representative of instructions that, when executed by processing circuitry, cause the processing circuitry to, perform the operations of any of Examples 1-40.

Example 43 is one or more non-transitory computer-readable media comprising instructions to cause an electronic device, upon execution of the instructions by one or more processors of the electronic device, to perform one or more elements of a method described in or related to any of Examples 1-40, or any other method or process described herein.

Example 44 is an apparatus comprising logic, modules, or circuitry to perform one or more elements of a method described in or related to any of Examples 1-40, or any other method or process described herein.

Example 45 is a method, technique, or process as described in or related to any of Examples 1-40.

Example 46 is an apparatus comprising: one or more processors and one or more computer readable media comprising instructions that, when executed by the one or more processors, cause the one or more processors to perform the method, techniques, or process as described in or related to any of Examples 1-40.

Example 47 is a signal as described in or related to any of Examples 1-40.

Example 48 is a signal in a wireless network as described in or related to any of Examples 1-40.

Example 49 is a method of coordinating communications in a wireless network as described in or related to any of Examples 1-40.

Example 50 is a device for processing communication as described in or related to any of Examples 1-40.

Example 51 is a network comprising respective devices and device communication mediums for performing any of the operations of Examples 1-40.

Example 52 is an edge cloud computing device implementation comprising processing nodes and computing units adapted for performing any of the operations of Examples 1-40.

Example 53 is an ETSI MEC system implementation comprising devices, processing nodes, and computing units adapted for performing any of the operations of Examples 1-40.

Example 54 is a MEC system implementation, including respective MEC entities including MEC hosts, MEC platforms, and orchestrator, adapted for performing any of the operations of Examples 1-40.

Example 55 is an Internet of Things (IoT) system implementation, including respective endpoint devices, intermediate nodes, and processing resources, adapted for performing any of the operations of Examples 1-40.

Example 56 is an edge cloud network platform comprising physical and logical computing resources adapted for performing any of the operations of Examples 1-40.

Example 57 is an apparatus comprising respective means for performing any of the operations of Examples 1-40.

Example 58 is a system to perform the operations of any of Examples 1-40.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An edge computing apparatus, comprising:
    processing circuitry; and
    memory, including instructions stored thereon that, when executed by the processing circuitry, cause the processing circuitry to perform operations that:
        identify a service operated with one or more computing resources of the edge computing apparatus, the service providing computing capabilities for an edge device to be connected to the edge computing apparatus with one or more Quality of Service (QoS) requirements, wherein the one or more QoS requirements includes a security requirement, wherein the security requirement includes pre-registration of the service;
        identify a mobility condition for the service, based on a change in network connectivity from the edge computing apparatus to the edge device;
        identify a second edge computing apparatus;
        determine whether the second edge computing apparatus supports the security requirement, the determination including:
            receiving a security configuration from the second edge computing apparatus; and
            validating, based on the received security configuration, that the second edge computing apparatus provides equivalent security capabilities to the edge computing apparatus by comparing the received security configuration with a security configuration of the edge computing apparatus;
        proactively reserve based on one or more predictive analytics used to determine resource needs based on anticipated service demands and network conditions, a resource for the service, prior to migration of the service, to be launched at the second edge computing apparatus;
        implementing a deadline-driven allocation of the proactively reserved resource by determining one or more time points for the resource needs;
        adjusting allocation of the proactively reserved resource to meet the deadline-driven allocation based at least in part on updated predictive analytics; and
        responsive to a determination that the second edge computing apparatus supports the security requirement, cause a migration of the service to the second edge computing apparatus.

2. The edge computing apparatus of claim 1, wherein the migration is performed using a migration interface.

3. The edge computing apparatus of claim 2, wherein the security requirement includes a capability of a secure compute environment.

4. The edge computing apparatus of claim 3, wherein the secure compute environment is a trusted execution environment (TEE).

5. The edge computing apparatus of claim 3, wherein the secure compute environment is used to assist the migration of the service, and wherein to assist the migration of the service, the secure compute environment conditionally allows the one or more computing resources to access a function, a sensor input, or code.

6. The edge computing apparatus of claim 5, wherein the secure compute environment conditionally allows the one or more computing resources access to the function, the sensor input, or the code according to a type of the secure compute environment and a strength of protection offered by the secure compute environment.

7. The edge computing apparatus of claim 1, wherein responsive to a determination that the second edge computing apparatus does not support the security requirement, the processing circuitry is to perform operations that:
    locate a security equivalent edge computing apparatus to which the service can be migrated, wherein to locate a security equivalent edge computing apparatus includes use of an orchestrator policy that defines an acceptable mapping and a security level; and
    migrate the service to the security equivalent edge computing apparatus.

8. The edge computing apparatus of claim 1, wherein the edge device is a vehicle, and wherein the mobility condition includes a change in a geographic location of the vehicle, a change in speed of the vehicle, and proximity of the vehicle to one or more network access points.

9. The edge computing apparatus of claim 1,
    wherein the reserved resource is reserved to enable migration of the service with uninterrupted use of the reserved resource at the second edge computing apparatus.

10. The edge computing apparatus of claim 1, wherein to proactively reserve the resource includes operations that:

identify usage of the service and the resource used for the service at the edge computing apparatus;
receive a location update from the edge device;
predict a location of the edge device;
predict usage of the service by the edge device at the predicted location based on the location update and the identified usage; and
communicate to the second edge computing apparatus the predicted location and usage of the edge device, wherein the predicted location and the predicted usage are used to reserve the resource at the second edge computing apparatus prior to the migration of the service.

11. The edge computing apparatus of claim 1, wherein the processing circuitry is further to perform operations that:
perform speculative allocation of a resource among a plurality of edge computing apparatuses including the second edge computing apparatus and a third edge computing apparatus, wherein the second edge computing apparatus is located along a first mobility path and the third edge computing apparatus is located along a second mobility path.

12. The edge computing apparatus of claim 11, wherein to perform the speculative allocation of the resource includes operations that:
identify multiple potential mobility location paths and multiple potential computing nodes for use of the service by the edge device, the potential mobility location paths including the first mobility path and the second mobility path, and wherein the potential computing nodes include the second edge computing apparatus and the third edge computing apparatus;
forecast a future resource need for execution of the service;
forecast a probability and an estimated time of usage of the service at the potential computing nodes according to the forecasted future resource need; and
communicate service pre-allocation information among the potential computing nodes in the potential mobility location paths.

13. The edge computing apparatus of claim 12, wherein the service pre-allocation information is used for the speculative allocation of the resource along respective nodes in the potential mobility location paths, and wherein the migration of the service to the second edge computing apparatus occurs based on movement of the edge device to the first mobility path.

14. The edge computing apparatus of claim 1, wherein the security requirement includes a requirement to re-initialize a workload environment to be used by the service, and wherein the pre-registration includes a reservation protocol to create a reservation for execution of one or more workloads associated with the service, and wherein the reservation protocol uses a recursive feedback telemetry.

15. At least one non-transitory computer-readable medium, including instructions stored thereon that, when executed by a processor of an edge computing apparatus, cause the edge computing apparatus to:
identify a service operated with one or more computing resources of the edge computing apparatus, the service providing computing capabilities for an edge device to be connected to the edge computing apparatus with one or more Quality of Service (QoS) requirements, wherein the one or more QoS requirements includes a security requirement, wherein the security requirement includes pre-registration of the service;
identify a mobility condition for the service, based on a change in network connectivity from the edge computing apparatus to the edge device;
identify a second edge computing apparatus;
determine whether the second edge computing apparatus supports the security requirement, wherein to determine includes to:
receive a security configuration from the second edge computing apparatus; and
validate, based on the received security configuration, that the second edge computing apparatus provides equivalent security capabilities to the edge computing apparatus by comparing the received security configuration with a security configuration of the edge computing apparatus;
proactively reserve, based on one or more predictive analytics to determine resource needs based on anticipated service demands and network conditions, a resource for the service, prior to migration of the service, to be launched at the second edge computing apparatus;
implement a deadline-driven allocation of the proactively reserved resource by determining one or more time points for the resource needs;
adjust allocation of the proactively reserved resource to meet the deadline-driven allocation, based at least in part on updated predictive analytics; and
responsive to a determination that the second edge computing apparatus supports the security requirement, cause a migration of the service to the second edge computing apparatus.

16. The at least one non-transitory computer-readable medium of claim 15, wherein the migration is performed using a migration interface.

17. The at least one non-transitory computer-readable medium of claim 15, wherein the security requirement includes a capability of a secure compute environment.

18. The at least one non-transitory computer-readable medium of claim 17, wherein the secure compute environment is a trusted execution environment (TEE).

19. The at least one non-transitory computer-readable medium of claim 17, wherein the secure compute environment is used to assist the migration of the service, and wherein to assist the migration of the service, the secure compute environment conditionally allows the one or more computing resources to access a function, a sensor input, or code, and wherein the secure compute environment conditionally allows the one or more computing resources access to the function, the sensor input, or the code according to a type of the secure compute environment and a strength of protection offered by the secure compute environment.

20. The at least one non-transitory computer-readable medium of claim 15, wherein responsive to a determination that the second edge computing apparatus does not support the security requirement, the instructions cause the edge computing apparatus to:
locate a security equivalent edge computing apparatus to which the service can be migrated, wherein to locate a security equivalent edge computing apparatus includes use of an orchestrator policy that defines an acceptable mapping and a security level; and
migrate the service to the security equivalent edge computing apparatus.

21. The at least one non-transitory computer-readable medium of claim 15, wherein the security requirement includes a requirement to re-initialize a workload environment to be used by the service, and wherein the pre-registration includes a reservation protocol to create a reservation for execution of one or more workloads associated with the service, and wherein the reservation protocol uses a recursive feedback telemetry.

22. An edge computing apparatus, comprising:
means for identifying a service operated with one or more computing resources of the edge computing apparatus, the service providing computing capabilities for an edge device to be connected to the edge computing apparatus with one or more Quality of Service (QoS) requirements, wherein the one or more QoS requirements includes a security requirement, wherein the security requirement includes pre-registration of the service;
means for identifying a mobility condition for the service, based on a change in network connectivity from the edge computing apparatus to the edge device;
means for identifying a second edge computing apparatus;
means for determining whether the second edge computing apparatus supports the security requirement, wherein the determining includes:
receiving a security configuration from the second edge computing apparatus; and
validating, based on the received security configuration, that the second edge computing apparatus provides equivalent security capabilities to the edge computing apparatus by comparing the received security configuration with a security configuration of the edge computing apparatus;
means for proactively reserving a resource, based on one or more predictive analytics to determine resource needs based on anticipated service demands and network conditions, for the service, prior to migration of the service, to be launched at the second edge computing apparatus;
means for implementing a deadline-driven allocation of the proactively reserved resource by determining one or more time points for the resource needs;
means for adjusting allocation of the proactively reserved resource to meet the deadline-driven allocation based at least in part on updated predictive analytics; and
means for, responsive to a determination that the second edge computing apparatus supports the security requirement, causing a migration of the service to the second edge computing apparatus.

23. The edge computing apparatus of claim 22, comprising:
means for identifying usage of the service and the resource used for the service at the edge computing apparatus;
means for receiving a location update from the edge device;
means for predicting a location of the edge device;
means for predicting usage of the service by the edge device at the predicted location based on the location update and the identified usage; and
means for communicating to the second edge computing apparatus the predicted location and usage of the edge device, wherein the predicted location and the predicted usage are used to reserve the resource at the second edge computing apparatus prior to the migration of the service.

24. The edge computing apparatus of claim 22, comprising:
means for performing speculative allocation of a resource among a plurality of edge computing apparatuses including the second edge computing apparatus and a third edge computing apparatus, wherein the second edge computing apparatus is located along a first mobility path and the third edge computing apparatus is located along a second mobility path.

25. The edge computing apparatus of claim 24, wherein performing the speculative allocation of the resource includes:
identifying multiple potential mobility location paths and multiple potential computing nodes for use of the service by the edge device, the potential mobility location paths including the first mobility path and the second mobility path, and wherein the potential computing nodes include the second edge computing apparatus and the third edge computing apparatus;
forecasting a future resource need for execution of the service;
forecasting a probability and an estimated time of usage of the service at the potential computing nodes according to the forecasted future resource need; and
communicating service pre-allocation information among the potential computing nodes in the potential mobility location paths.

26. The edge computing apparatus of claim 25, wherein the service pre-allocation information is used for the speculative allocation of the resource along respective nodes in the potential mobility location paths, and wherein the migration of the service to the second edge computing apparatus occurs based on movement of the edge device to the first mobility path.

27. The edge computing apparatus of claim 22, wherein responsive to a determination that the second edge computing apparatus does not support the security requirement, the edge computing apparatus comprises:
means for locating a security equivalent edge computing apparatus to which the service can be migrated, wherein to locate a security equivalent edge computing apparatus includes use of an orchestrator policy that defines an acceptable mapping and a security level; and
means for migrating the service to the security equivalent edge computing apparatus.

28. The edge computing apparatus of claim 22, wherein the security requirement includes a requirement to re-initialize a workload environment to be used by the service, and wherein the pre-registration includes a reservation protocol to create a reservation for execution of one or more workloads associated with the service, and wherein the reservation protocol uses a recursive feedback telemetry.

* * * * *